Figure 1:
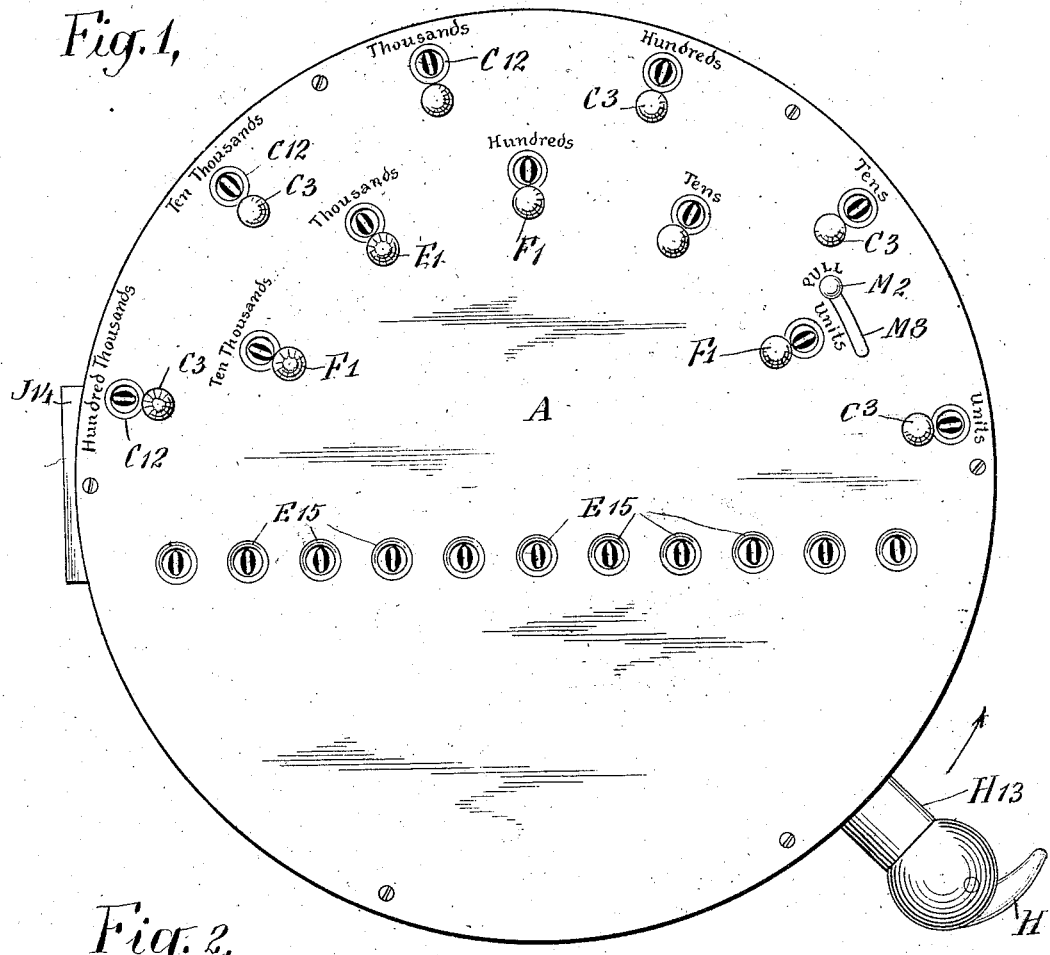

L. W. ROSENTHAL.
CALCULATING MACHINE.
APPLICATION FILED FEB. 14, 1911. RENEWED JUNE 16, 1915.

1,168,745.

Patented Jan. 18, 1916.
8 SHEETS—SHEET 1.

Witnesses:

Inventor
Leon W. Rosenthal
By his Attorneys
Pennie + Goldsborough

L. W. ROSENTHAL.
CALCULATING MACHINE.
APPLICATION FILED FEB. 14, 1911. RENEWED JUNE 16, 1915.
1,168,745.
Patented Jan. 18, 1916.
8 SHEETS—SHEET 2.
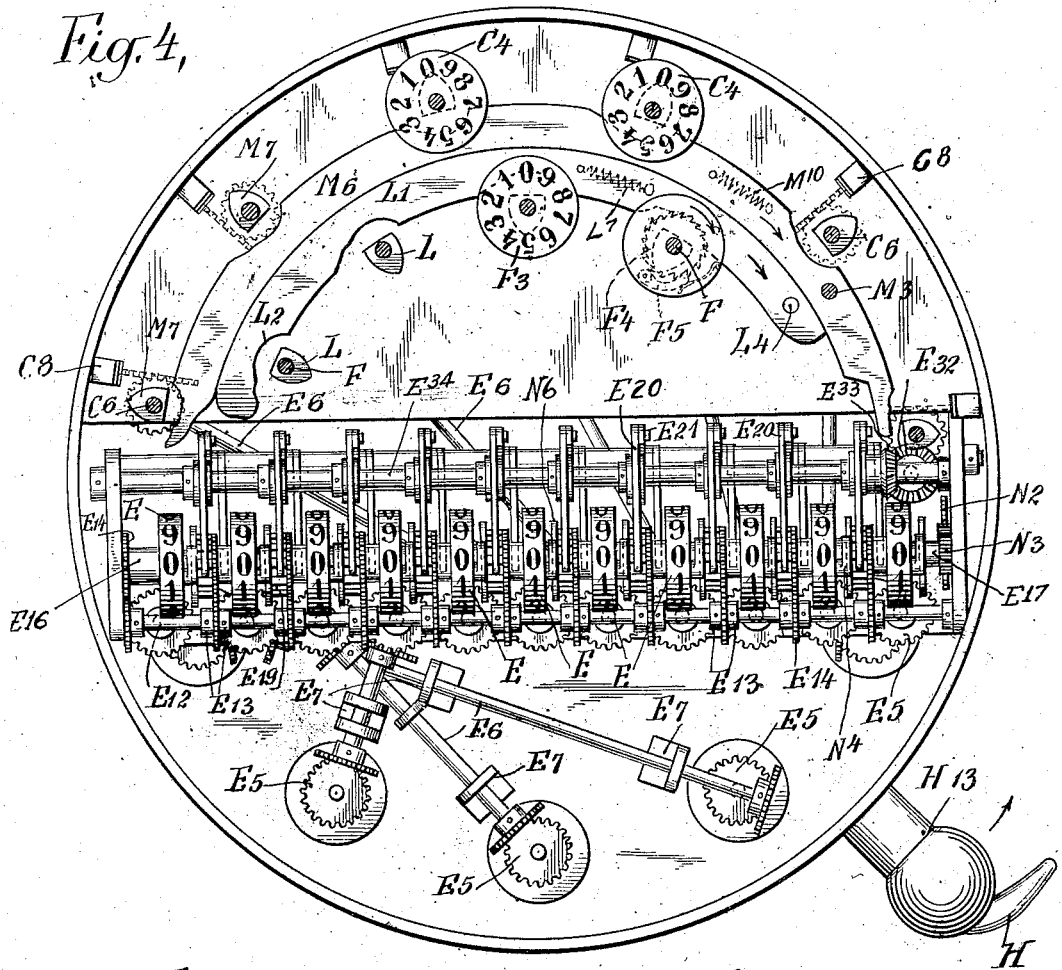
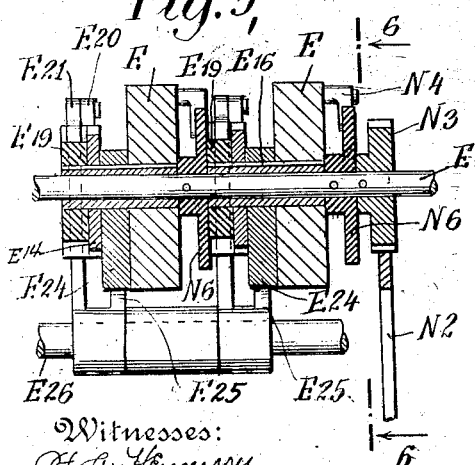
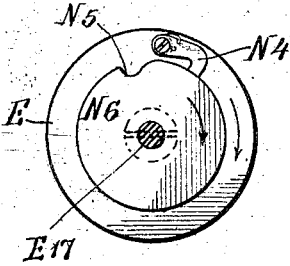
Inventor
Leon W. Rosenthal
By his Attorneys

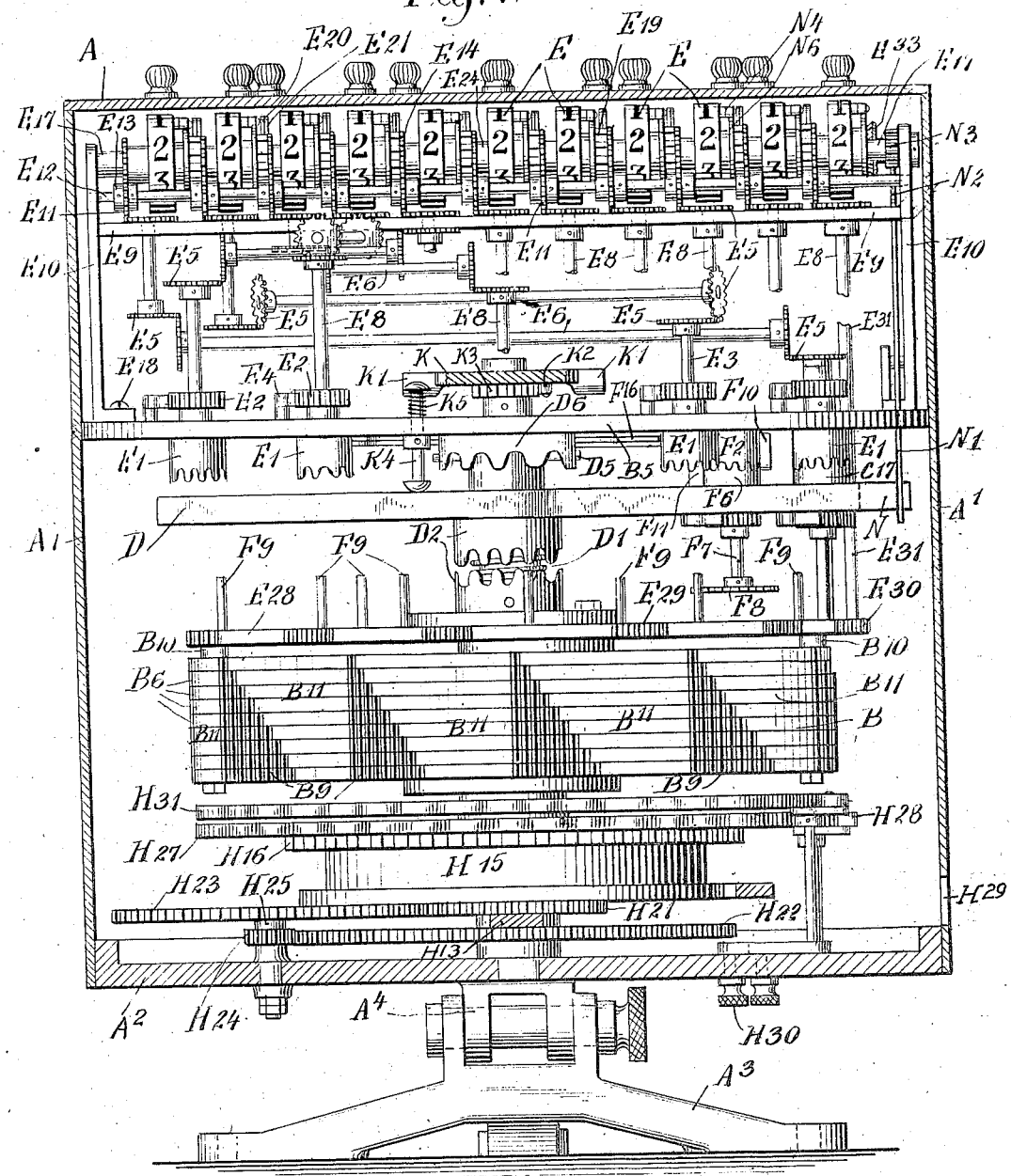

L. W. ROSENTHAL.
CALCULATING MACHINE.
APPLICATION FILED FEB. 14, 1911. RENEWED JUNE 16, 1915.
1,168,745.
Patented Jan. 18, 1916.
8 SHEETS—SHEET 4.
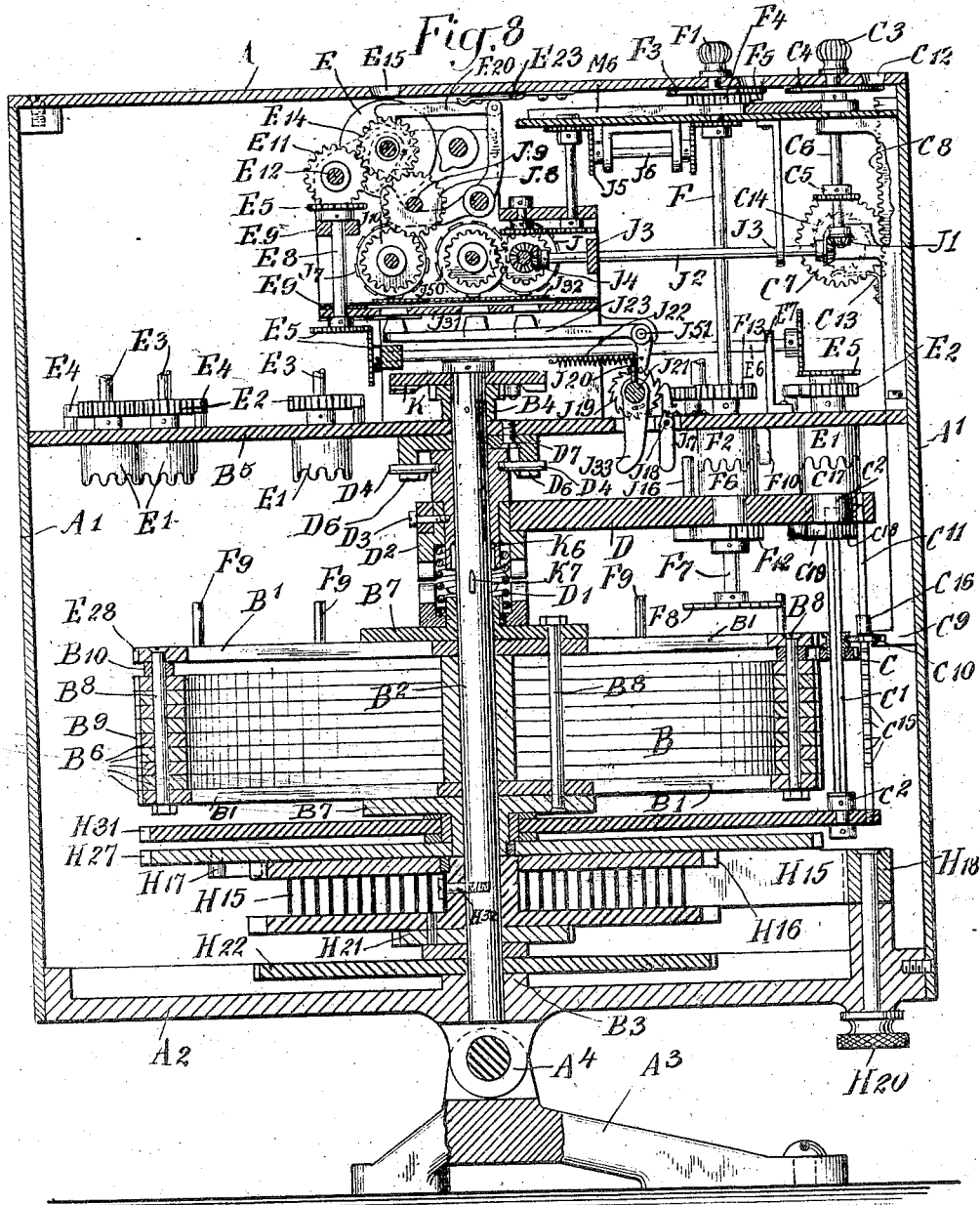
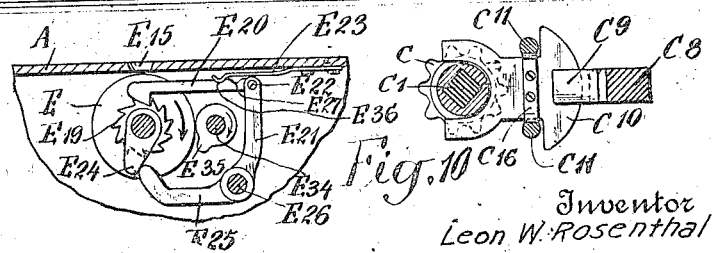
Witnesses:
Inventor
Leon W. Rosenthal
By his Attorneys
Pennie + Goldsborough L. W. ROSENTHAL.
CALCULATING MACHINE.
APPLICATION FILED FEB. 14, 1911. RENEWED JUNE 16, 1915.
1,168,745. Patented Jan. 18, 1916.
8 SHEETS—SHEET 5.
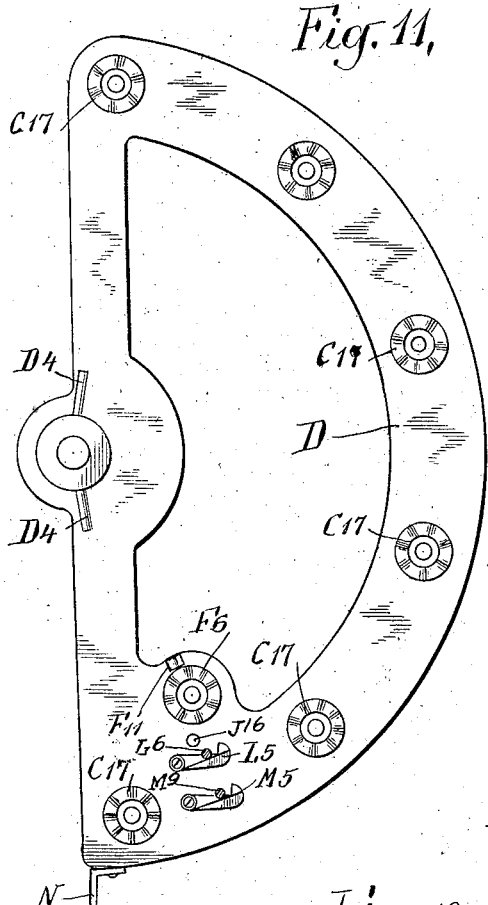
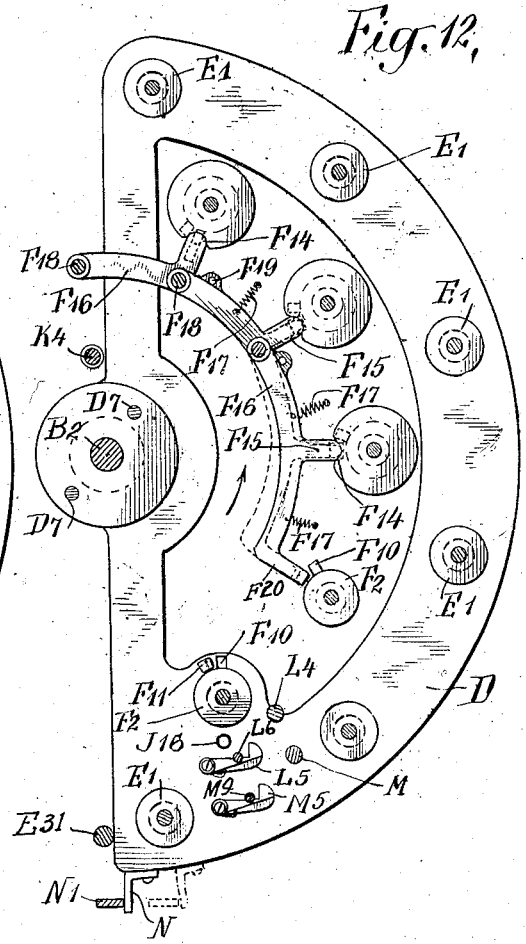
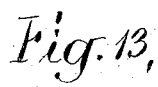
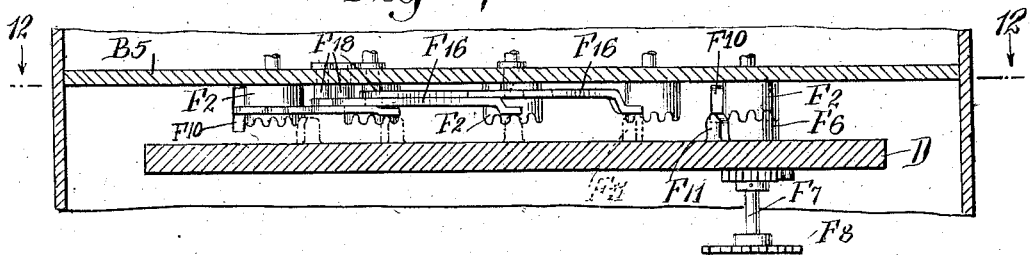
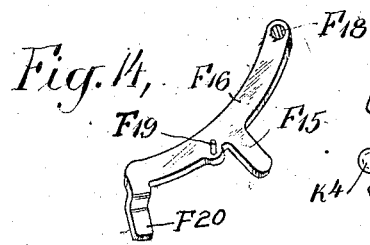
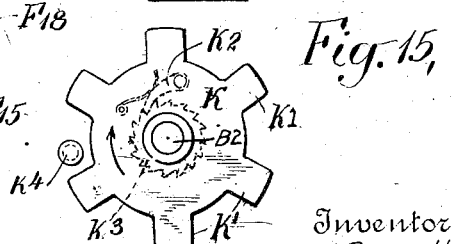
Inventor
Leon. W. Rosenthal
By his Attorneys L. W. ROSENTHAL.
CALCULATING MACHINE.
APPLICATION FILED FEB. 14, 1911. RENEWED JUNE 16, 1915.

1,168,745.

Patented Jan. 18, 1916.
8 SHEETS—SHEET 6.

Witnesses:

Inventor
Leon W. Rosenthal
By his Attorneys
Pennie + Goldsborough

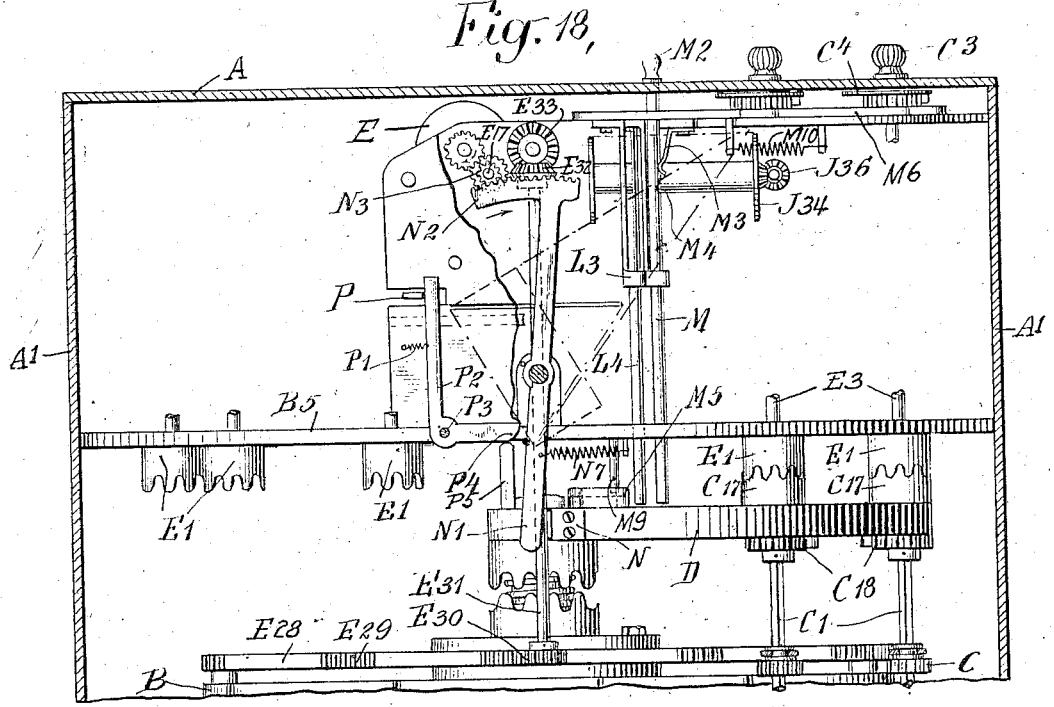
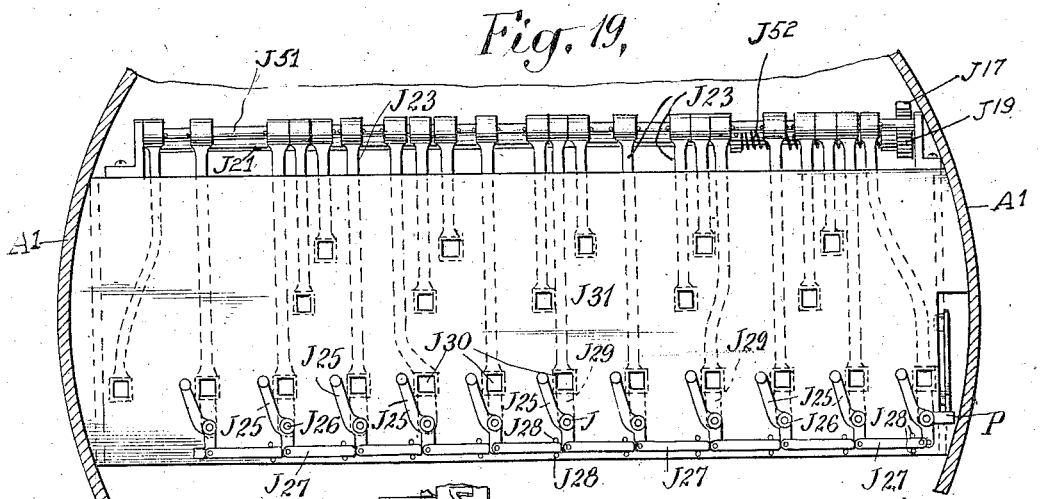
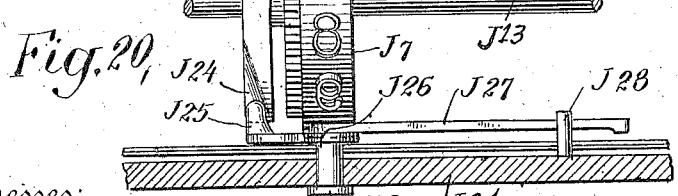

L. W. ROSENTHAL.
CALCULATING MACHINE.
APPLICATION FILED FEB. 14, 1911. RENEWED JUNE 16, 1915.

1,168,745.

Patented Jan. 18, 1916.
8 SHEETS—SHEET 8

UNITED STATES PATENT OFFICE.

LEON W. ROSENTHAL, OF NEW YORK, N. Y.

CALCULATING-MACHINE.

1,168,745. Specification of Letters Patent. Patented Jan. 18, 1916.

Application filed February 14, 1911, Serial No. 608,622. Renewed June 16, 1915. Serial No. 34,550.

*To all whom it may concern:*

Be it known that I, LEON W. ROSENTHAL, a citizen of the United States, residing at No. 240 West One Hundred and Thirty-seventh street, city of New York, county of New York, State of New York, have invented certain new and useful Improvements in Calculating-Machines; and I do hereby declare the following to be a full, clear, and exact description of the invention, such as will enable others skilled in the art to which it appertains to make and use the same.

The present invention relates to calculating machines; and particularly to one adapted to automatically perform multiplication of whole and decimal numbers of any number of digits within the range for which the machine may be especially designed and for any sequence and value of the digits in either factor.

One object is to provide a multiplying machine such that when the multiplicand and multiplier are set up and the machine put into operation, the multiplication of the factors is automatically performed.

Another object is to provide a machine which performs multiplication in the minimum time.

Another object is to provide means for automatically printing the multiplicand, multiplier and product, in the usual arrangement of the example.

Another object is to provide mechanism such that when once put into motion continues that motion to finality, but automatically stops the machine immediately upon completion of the multiplication, irrespective of the number, value and sequence of the digits in either factor, except when the multiplier contains but one digit whereupon the machine operates a trifle longer.

Another object is to provide a motor for actuating the devices such that it may be easily adjusted in its action to accord with the efficient speed of the machine and which must be completely rewound to its starting condition before another operation can be performed.

Another object is to provide means for automatically clearing the machine during the rewinding operation and for retaining at will a multiplicand once set up.

Another object is to provide a machine in which the factors are conveniently set up in the natural order of their digits, progressing successively from the highest to the lowest denomination, or from left to right.

Another object is to provide means for exposing to view the multiplicand and the multiplier from the time they are set up to the time they are cleared, and to expose the product to view in convenient relation to them.

Another object is to provide a machine of simple construction, small size, accuracy, and durability, as will be pointed out in detail in the description and drawings of the preferred embodiment of the machine.

Multiplication may be performed in two general ways; to wit, by properly adding the partial product of each of the multiplicand digits and each of the multiplier digits, or by properly adding the multiplicand number a number of times equal to the units in each digit of the multiplier. Both methods have been employed in machines heretofore devised. The machine herein disclosed operates on the second principle, called the addition principle.

In the preferred embodiment of my invention, there is one rotatable multiplier drum and it has disposed circumferentially around its outer periphery a plurality of like series of progressively stepped teeth arranged parallel to each other and to the axis of rotation of the drum, and a depressed blank space between all the series. Each series consists of a blank space representing 0, and nine teeth representing in length the nine digits, 1 to 9. There is a plurality of concentrically arranged multiplicand members circumferentially separated by one series of teeth. Each multiplicand member comprises a square shaft along which a gear adjustably slides in engagement with the teeth on the multiplier drum, means for adjusting the position of the gear along the drum, a dial having the digits 0 to 9 consecutively arranged to indicate the adjustment of the gear, and a face clutch on the end of the shaft forming a part of the mechanism for transmitting the rotary motion of the multiplicand gear to a product wheel. Upon rotation of the multiplier drum, each multiplicand gear is turned through the number of teeth that pass it, and since any gear may be adjusted to any point along the drum, any gear may be turned through 0 to 9 teeth during the passage of each series of teeth on the drum. Therefore, by turning the drum through a number of series of teeth each gear is turned through a corresponding multiple of the number of teeth in each series for which it is set. By providing nine or more series of teeth around the drum, the multiplicand digits represented by the adjustments of the respective multiplicand gears are simultaneously multiplied by any multiplier digit from 0 to 9 during one rotation or less than one rotation of the drum.

To properly add the number of teeth through which the multiplicand gears turn, there is a series of product wheels each having connecting devices for transmitting the rotary motion of the circularly arranged multiplicand gears to rotary motion of corresponding extents of the linearly arranged product wheels. Each product wheel has the digits 0 to 9 consecutively arranged around its periphery so that the number of teeth through which each multiplicand gear turns is properly exposed to view on the respective product wheel through an aperture in the cover. The units are properly carried to the product wheels of next higher denominations by transfer devices, just after the passage of each series of drum teeth.

The multiplier members comprise a series of circularly arranged shafts, each carrying a dial and a clutch with a cam, adapted to be set for any multiplier digit. These clutches engage successively with a multiplier actuating clutch which is turned one-tenth of a rotation just before the passage of each series of drum teeth and just after the transfer operation. When the drum has turned through the number of series of teeth for which the engaging multiplier clutch is set, the cam on the multiplier clutch comes into contact with another cam on the indentation member, whereupon the indentation member with the multiplicand clutches and the multiplier actuating clutch are collectively depressed and then turned with the multiplier drum until each multiplicand clutch engages the product clutch of next higher denomination and the multiplier actuating clutch engages the multiplier clutch of next higher denomination, reproducing in this way the step of indentation of ordinary multiplication. The same operation is repeated until the last multiplier digit is used, whereupon the spring motor which operates the multiplier drum is automatically stopped. Upon rewinding of this spring motor to its original operative condition, the multiplicand, multiplier and product are printed, and the machine is entirely cleared or set to zero for the next operation. Or, if desired, the adjusted position of the multiplicand gear may be retained and then brought to zero by hand at will, which is especially desirable in a series of multiplications involving a constant factor.

The operating mechanism comprises a coiled spring, which turns the drum in one direction only by means of a ratchet wheel and pawl, the spring being attached at one end to the drum shaft and at the other end to a set screw adapted to adjust the tension of the spring to the efficient speed of the machine; an operating handle connected to the spring through a set of reducing gears so that upon unwinding of the spring a number of rotations of the drum moves the handle through but a part of one rotation, and upon rewinding the spring, a part of one rotation of the handle completely restores the spring to its normal operative condition. Furthermore, the actuation of a cam at the inception of the multiplication process prevents interruption of the operation until it is carried to finality, while other means necessitate the complete rewinding of the spring before the next multiplication can be performed.

The printing mechanism consists of a series of multiplicand type wheels, a series of multiplier type wheels and a series of product type wheels, each series being linearly arranged and connected by gears and shafts to the corresponding series of indicating devices. When the operating handle is being pulled back and just before the machine starts to clear, the multiplicand, multiplier and product are printed on a slip of paper from their respective type wheels by means of printing hammers and an inked ribbon. Those printing hammers of higher denomination than the highest denomination in the respective items are prevented from actuation, so that the printed items show no zeros before their first significant figures. The inked ribbon is moved during each multiplication until it is wound almost off of one wheel, when its direction of movement is automatically reversed. The strip of paper with the printed items thereon is then pulled out of the machine, so that a permanent record of the problem is obtained. Another slip of paper is then inserted for the next operation.

During the rewinding and just after the printing operation, the multiplicand members are automatically returned to their adjusted positions and brought to zero with their dials, if desired, while the multiplier members, product wheels and all the type wheels are returned to zero. The multiplier drum is turned backward with the indentation member to its normal position, which operation constitutes but a small part of the rewinding period. The multiplicand gears and dials may be returned to their zero positions by hand when desired.

The mechanism is entirely inclosed in a cylindrical casing, having a cover with apertures for exposing to view the multiplicand, multiplier and product. The machine is operable in any tilted position and is mounted on a stand by means of an adjustable hinge adapted to secure the machine in any tilted position.

Figure 2:
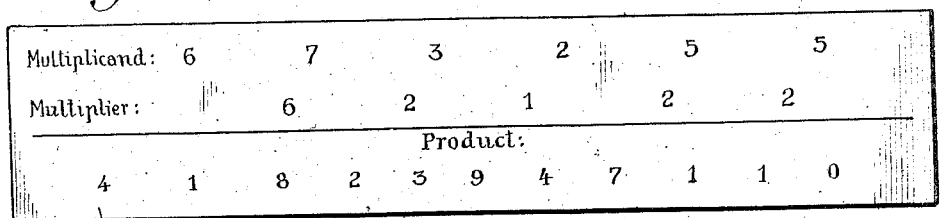
Figure 3:
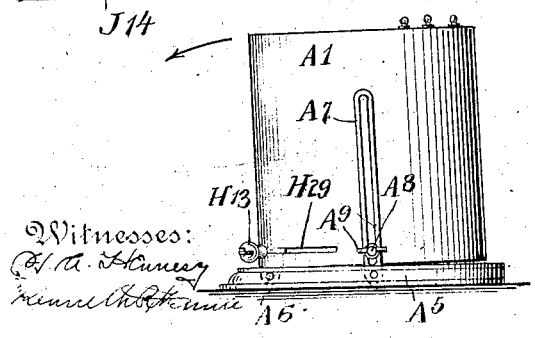
Figure 16:
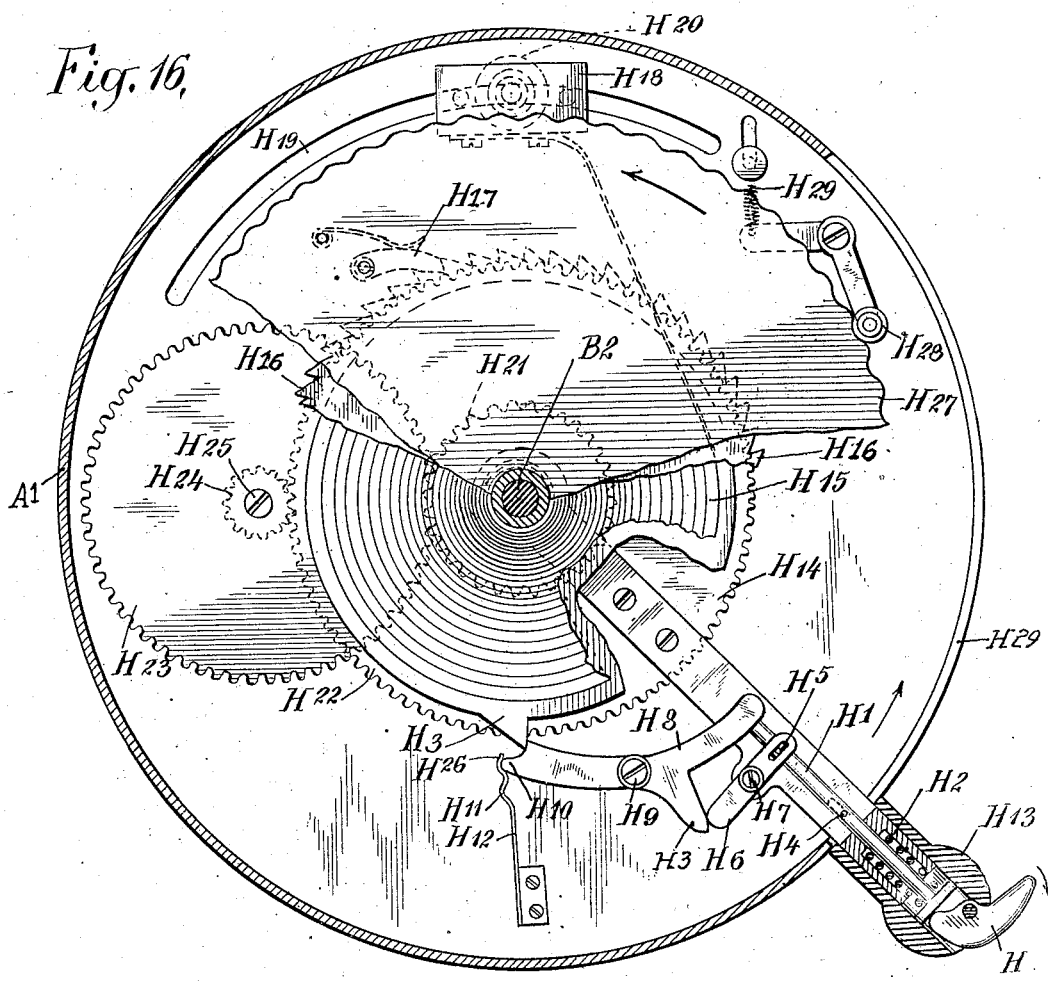
Figure 17:
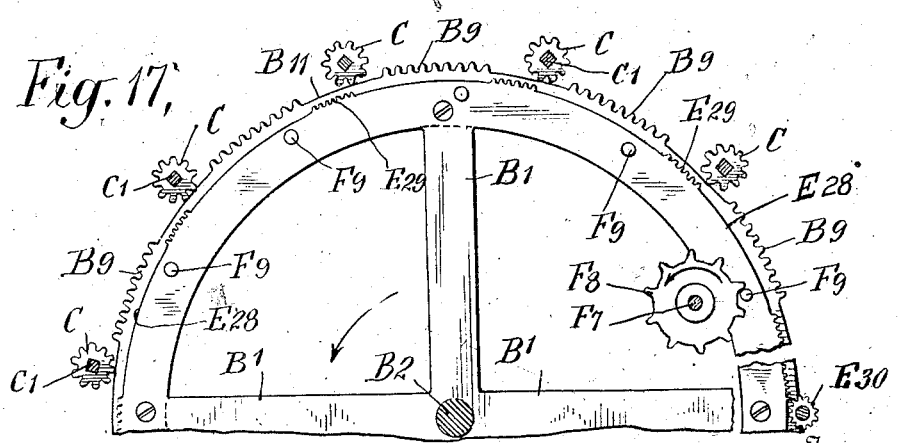
Figure 21:
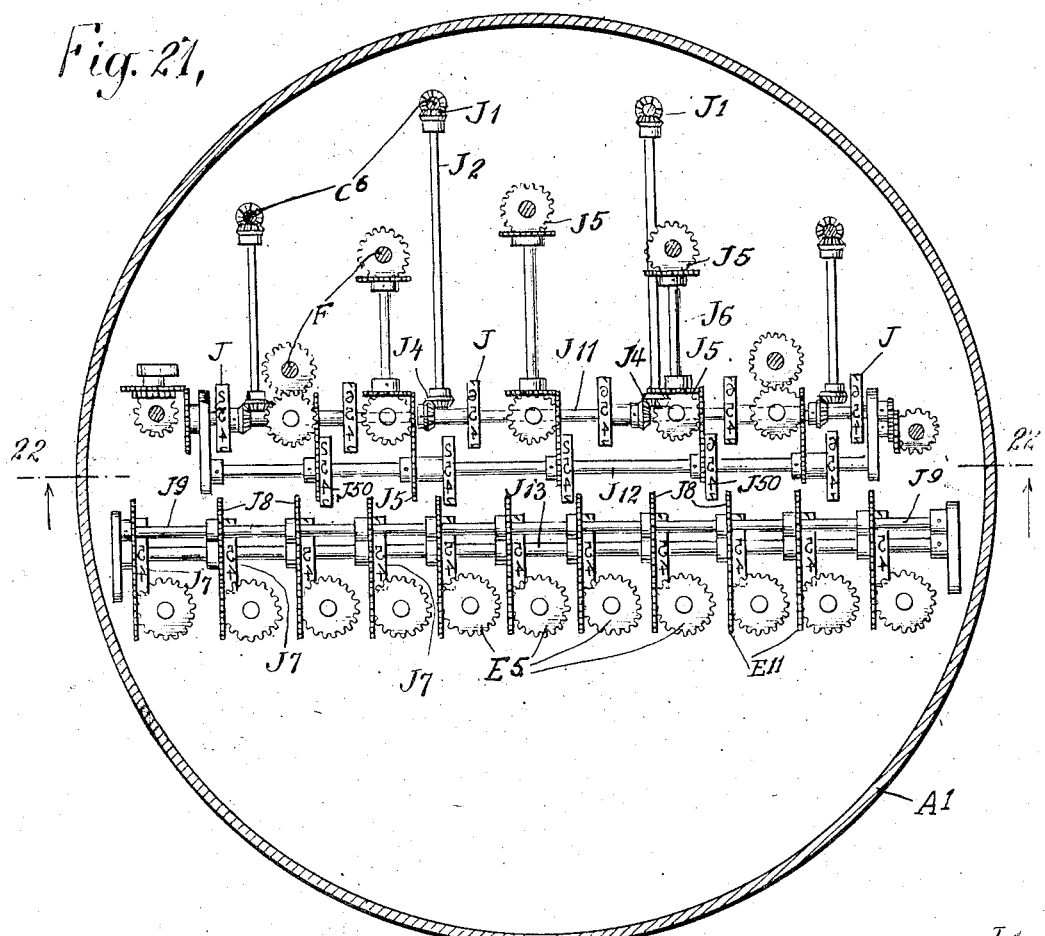
Figure 22:
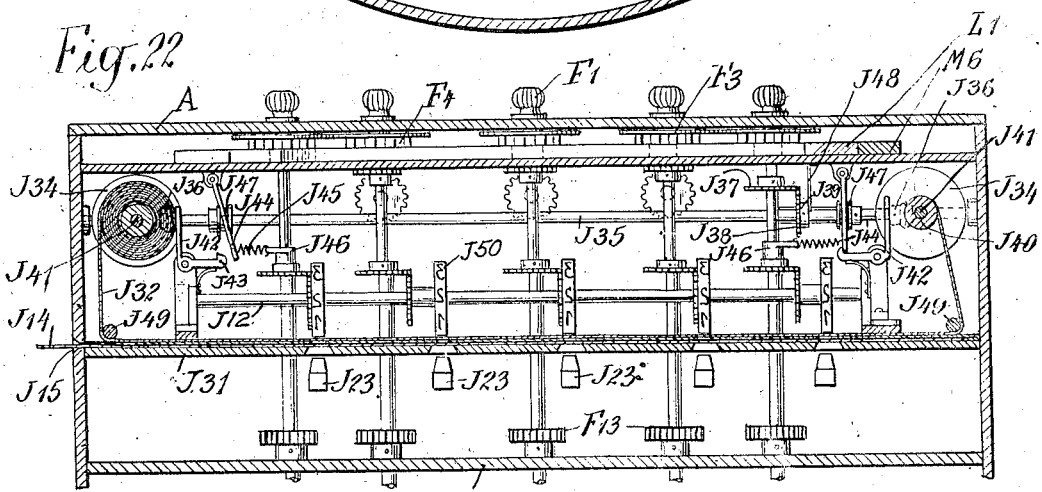

In the accompanying drawings forming a part of this specification and serving to illustrate the preferred embodiment of my invention, Figure 1 is a top view of the machine ready for operation; Fig. 2 shows the slip of paper after printing, illustrating the arrangement of the printed items and the manner of indicating them; Fig. 3 is a side view of the machine with modified means for adjusting it in tilted positions; Fig. 4 is a plan view of the machine with the cover removed, showing the product wheels, parts of the multiplicand and multiplier members and their clearing devices, and the means for connecting the circularly arranged product clutches with the linearly arranged product wheels; Fig. 5 is a sectional elevation along the center of the shaft which supports the product wheels, showing also the transfer mechanism and the clearing devices; Fig. 6 is a side view of a part of the clearing mechanism for the product wheels; Fig. 7 is a side elevation of the machine with the cylindrical casing removed, showing the parts in their normal position; Fig. 8 is a sectional elevation at right angles to Fig. 7, also showing the printing mechanism; Fig. 9 is a detailed view of the transfer mechanism, for carrying units from one product wheel to the one of next higher denomination; Fig. 10 is a detailed view of the connection to the multiplicand gear for adjusting it in position along the multiplier drum; Fig. 11 is a top view of the indentation member which carries the multiplicand clutches, the multiplier actuating clutch and parts of the clearing mechanism; Fig. 12 is a top view of the indentation member on line 12—12 of Fig. 13, showing also the multiplier clutches and the estopment bars for automatically stopping the motor when the multiplier digit of highest denomination has been used; Fig. 13 is a side view, partly in section, showing the multiplier clutches and the automatic stopping devices; Fig. 14 is a perspective view of one of the estopment bars; Fig. 15 is a plan view of the device for returning the indentation member to its normal position upon clearing the machine; Fig. 16 is a plan view, partly broken away, showing particularly the details of the spring motor, the operating handle and the controlling and adjusting mechanism; Fig. 17 is a diagram illustrating the relative periods of actuation of the multiplicand gears, the transfer gear and the multiplier actuating gear; Fig. 18 is a sectional elevation of the upper part of the machine, showing the devices for automatically clearing the multiplicand, multiplier and product indicating and printing members; Fig. 19 is a plan view of the printing hammers and the means for preventing their actuation; Fig. 20 is an elevation of a printing wheel, partly broken away, illustrating a part of the mechanism, for preventing the actuation of the printing hammers; Fig. 21 is a top view of the printing wheels, showing their connections to the multiplicand, multiplier and product members; Fig. 22 is a sectional elevation on line 22—22 of Fig. 21, showing particularly the arrangement of the inked ribbon and its actuating mechanism.

The casing protecting the internal mechanism consists of a top cover A, the hollow cylindrical part $A^1$ and the bottom plate $A^2$ suitably connected together. The bottom plate is connected to the base or stand $A^3$ by a hinge $A^4$, thereby allowing the machine to be tilted to that position most convenient for operation and reading. The hinge joint comprises cored lugs projecting from the base plate $A^2$ and the stand $A^3$, and a bolt passing through the lugs. A thumb nut screwed tightly on the bolt holds the machine in any position to which it may be adjusted. The stand may be screwed to a table or other suitable place. Or, I may adopt the modification illustrated in Fig. 3, wherein the machine is pivotally connected to the base $A^5$ at $A^6$ and is held in any tilted position by the swinging link $A^7$, the bolt $A^8$ extending from the casing of the machine and the wing nut $A^9$ screwed on the bolt.

So far as I am aware, this is the first calculating machine having a multiplier member with a plurality of series of actuating means wherein each series is adapted to register 0 to 9 digits at will on the adding mechanism, whether the actuating means be disposed on the periphery of a drum or otherwise, and whether the actuating means be stepped teeth or of any other suitable form. In this way, the multiplier drum herein shown requires but one-eleventh of a complete rotation for each unit in each digit of one factor to be multiplied, although this fraction is varied in accordance with the desired range of the machine by altering the number of series of teeth on the multiplier drum. This construction results in rapid operation, simplicity and compactness of parts and other features of importance, so that the claims in connection therewith should be broadly interpreted.

The multiplier drum B is loosely mounted by means of the arms $B^1$ on the rotatable drum shaft $B^2$ which is journaled in the bearings $B^3$ and $B^4$ carried by the base plate $A^2$ and the shelf plate $B^5$. The drum is made of suitable metal such as steel, brass, or the like, and may consist of a plurality of plates, rings or annuli $B^6$ compactly fastened together between the end plates $B^7$ by means of the through bolts $B^8$ the annuli having teeth $B^9$ circumferentially disposed around their outer peripheries. However, the drum with teeth thereon may be cast, or the teeth may be milled or otherwise cut out of a cylinder, although I prefer to build up the drum from a plurality of steel annuli having the teeth stamped out, the annuli being separated, if desired, by washers or spacing blocks similar to $B^{10}$. The essential thing is to produce a drum of inexpensive, compact and rigid construction of minimum weight commensurate with the required dimensions, so that its speed of rotation may be altered with ease and rapidity.

The outer periphery of the drum is provided with teeth $B^9$ parallel to each other and to the axis of the drum. The teeth are progressively stepped in length, forming a plurality of like series, each series consisting of a blank for 0 and nine teeth representing in length the nine digits 1 to 9. The teeth of each series on the drum may be arranged promiscuously but I prefer to have them progressively stepped starting from the bottom with a blank, then a tooth of unit length, etc., finally ending with a tooth of nine units length or nearly the total length of the drum. There may be any number of such series of teeth around the multiplier drum, but in order to multiply by 9 or a lesser digit in one or less than one complete rotation of the drum, I prefer to provide at least nine series of teeth but more than nine series where efficient design requires it. Accordingly, the superposed annuli have a progressively increasing number of teeth in each series, starting with a blank space at the top and ending at the bottom with an annulus having nine teeth in each series. The annuli are superposed so that corresponding teeth are in alinement throughout the length of the drum. There is a depressed blank space $B^{11}$ between all series of teeth on each annulus for the purpose of transferring units to the product wheels of next higher denominations, and for the purpose of effecting indentation, as will be noted later.

In the drawings there are eleven series of drum teeth to accommodate eleven product members. Between adjoining series there is a depressed blank space, arbitrarily chosen about equal in circumferential length to the circumferential length of the series of teeth.

Although any other suitable number may be used, I show six multiplicand members arranged on the arc of a circle concentric with the periphery of the multiplier drum. The multiplicand members have an angular spacing of 360°/11, equal to that of each series of drum teeth. The multiplicand gears always end their rotation at the same time, and when they are adjusted to the same digit they start their rotation at the same time as indicated in Fig. 17, although these conditions may be reversed or otherwise altered if desired. I may properly increase the circumferential distance between these series of drum teeth and then reduce the angular spacing of the members. In fact, this scheme may in some cases result in more compact design and more convenient arrangement than herein shown, as will be readily understood.

Each multiplicand gear C has ten teeth (although this number is immaterial) and is adapted to slide on the square shaft $C^1$ and to turn the shaft with it in the bearings $C^2$. Upon turning any multiplicand button $C^3$, the multiplicand dial $C^4$ and the gear $C^5$ fastened on the shaft $C^6$ are each turned through the same angle. The gear $C^7$ meshed with gear $C^5$ is turned thereby and the engaging rack $C^8$ is moved vertically. At the end of the rack $C^8$ is a projection $C^9$ (Fig. 10) embracing one end of a member $C^{10}$ which slides between the two shafts $C^{11}$. The other end of this member is forked so as to embrace a reduced portion in the hub of the multiplicand gear C. When the multiplicand button is turned from its zero position, the multiplicand gear C is lowered from the position shown in Fig. 8, where the teeth on the drum do not engage the gear, and the number of drum teeth in each series which engage the gear is always exposed on the multiplicand dial through the aperture $C^{12}$ in the cover. In this way, any multiplicand number within the range of the machine is exposed to view. The spring $C^{13}$ and the toothed or serrated wheel $C^{14}$ fastened to the gear $C^7$ forces the exact position of the multiplicand dial for any setting. To securely hold the multiplicand gear in any of its adjusted positions and to minutely force the exact position irrespective of lost motion in the setting members, the shaft $C^{11}$ has properly spaced depressions $C^{15}$ of suitable form in which the spring $C^{16}$ carried by the members $C^{10}$ adjusts itself.

Each of the multiplicand gears C turns a square shaft $C^1$ and an actuating or multiplicand clutch $C^{17}$ depressibly mounted thereon. This clutch may have any convenient number of teeth, but the movement of the multiplicand gear through each of its ten teeth turns the clutch through one-tenth of a complete rotation. Each multiplicand clutch is rotatably mounted on the indentation member D and is forced into proper positions and held fixed when out of engagement by the serrated wheel $C^{18}$ fastened on the shaft $C^1$ and the spring $C^{19}$ supported from the indentation member.

When the multiplicand gears are collectively turned around the drum shaft to effect indentation of the partial products, as will be noted later, each member $C^{10}$ comes out of its forked member $C^9$ on the end of the rack. Those members which have the same setting along the multiplier drum will pass through the corresponding forks, while those of different setting will clear the outsides of the forks owing to the selected width of the forks relative to the thickness of a drum annulus. Furthermore, upon returning the multiplicand members to their normal positions in clearing the machine, all the members $C^{10}$ will again enter their respective forks and thus be in a position to be raised to their zero setting. The multiplicand dials retain their original settings throughout the multiplication operation, so that upon completion of a problem the multiplicand is still exposed to view. The elements of the multiplicand members could be turned around the drum shaft during indentation, but the means herein disclosed have been devised for retaining the dials in a fixed position. So far as I am aware this idea is broadly new and therefore the claims in connection therewith should be broadly interpreted.

There are eleven product wheels E and therefore eleven product clutches $E^1$ and connecting members adapted to transmit the rotary motion of the multiplicand gears to the result or product wheels. Six of the product clutches are engaged at a time with the six multiplicand clutches and the series progressively advances after each indentation from the series of lowest denomination to the series of highest denomination. Each product clutch is journaled in the shelf plate $B^5$ and is provided with a serrated wheel $E^2$ fastened on the shaft $E^3$ and a spring $E^4$ fixed to the shelf plate to hold the clutch when out of engagement so that it will nicely fit when again put into engagement. Each product clutch controls a gear $E^5$ adapted to turn its product wheel by means of properly arranged gears and shafts, as shown more particularly in Figs. 4 and 7. The shafts $E^6$ are journaled in bearings $E^7$ supported from a shelf plate and the shafts $E^8$ are journaled in the cross bar $E^9$ which is properly fastened to the end pieces $E^{10}$. The gears $E^{11}$ are loosely mounted on a shaft $E^{12}$ between the pinned disks $E^{13}$, while the gears $E^{14}$ are fastened to their respective product wheels E. All these gears are identical so that the movement of the multiplicand gears through each tooth advances the respective product wheels through one digit as seen through the product apertures $E^{15}$ in the cover. The product wheels E are fastened on the sleeves $E^{16}$ which are loosely mounted on the shaft $E^{17}$ (Fig. 5). This shaft is journaled in the end pieces $E^{10}$ which are fastened to the shelf plate at $E^{18}$. (Fig. 7).

I may also use belts, chains, perforated steel tapes or any other suitable means for transmitting the rotary motion of the circularly arranged product clutches to the linearly arranged product wheels. The result attained is especially important in a calculating machine for any purpose, since the extreme compactness and inexpensive construction resulting from the circular arrangement of the actuating or multiplicand members is combined with the convenient disposal of the result or product indicators. So far as I am aware this idea is broadly new and therefore the claims in connection therewith should be broadly interpreted.

The process of transferring units to the next higher denominations is performed after the passage of each series of drum teeth. The series of drum teeth are separated circumferentially by depressed blank spaces wherein the process of transferring units is performed. One annulus is provided for this purpose. The position of the teeth relative to the transfer gear is such that the transfer gear is actuated only when the multiplicand gears are in the depressed blank spaces of the drum and thus inoperative. As shown here the transfer teeth exist only in alinement with the depressed blank spaces between the series of drum teeth.

While many forms of transfer devices for carrying the units from lower to higher denominations have been used, a particularly desirable form for this machine is disclosed herein. (Figs. 5 and 9). Each product wheel, except the one of lowest denomination, carries on one side a ratchet wheel $E^{19}$, continually engaged with a pawl $E^{20}$ which is pivoted on the lever $E^{21}$ at $E^{22}$ and is pressed down by the spring $E^{23}$. On the other side of each product wheel, except the one of highest denomination, is a cam $E^{24}$ adapted to force down the lever $E^{25}$. The levers $E^{21}$ and $E^{25}$ are loosely mounted on the shaft $E^{26}$ so that as the product wheel is turned from 9 to 0, its cam turns the pawl of the next higher product wheel one tooth against the direction of rotation of the ratchet wheel. Therefore, after the actuation of the product wheels by each series of drum teeth, all those wheels to which a unit is to be transferred have their pawls in the backward position with the springs in the depressions $E^{27}$. In order to turn those product wheels through one digit after they have been actuated by each series of drum teeth, the transfer annulus $E^{28}$ with a series of teeth $E^{29}$ for each series of drum teeth is fastened on the drum shaft in such relative position to the other parts that the transfer gear $E^{30}$ is actuated only when the multiplicand gears are in the depressed blank spaces of the drum. The transfer teeth may be of any convenient pitch, but in order to obtain a multiplier drum of minimum diameter, a pitch higher than that of the drum teeth is shown. The transfer gear (Fig. 7) is fastened on the shaft $E^{31}$ which extends through bearings to the bevel gear $E^{32}$ engaging with and turning the bevel gear $E^{33}$ (Fig. 4) and the shaft $E^{34}$ in the direction of the arrow of Fig. 9. The number of teeth in each series on the transfer annulus and the teeth in the transmitting connections are such that the shaft $E^{34}$ is turned through one rotation for each transfer operation. A wheel with a nose projection $E^{35}$ is fastened on the shaft $E^{34}$ in line with each lever $E^{21}$. The noses are consecutively displaced angularly so that those levers in the backward position are successively returned and the units transferred in the order of the denomination of the product wheels. Hence the units are transferred either as a result of the actuation of the multiplicand gears or as a result of a transfer. It is evident that all the pawls are restored to their normal positions, wherein the springs $E^{23}$ rest in the depressions $E^{36}$ after each rotation of the shaft $E^{34}$, while further rotation in either direction will not then disturb them. Besides acting as a part of the transfer mechanism, the pawls and ratchet wheels also force the exact positions of the product wheels irrespective of any lost motion in the connecting mechanism between the multiplicand gears and the product wheels.

The multiplier members determine the number of series of drum teeth which pass each multiplicand gear before the subsequent indentation. The machine may be designed for any number of multiplier digits, although I show one with a range of five digits since this range is convenient for a machine having eleven product wheels. The multiplier members are spaced on the same angle as the multiplicand members (Fig. 12), so that after each indentation the multiplicand clutches and the multiplier actuating clutch will engage successive product and multiplier clutches. The multiplier shaft F has fastened to it the multiplier button $F^1$ at one end and a multiplier clutch $F^2$ at the other. The multiplier dials $F^3$ are loosely mounted on their shafts and are turned therewith in only one direction, clockwise as viewed from above, by means of the ratchet wheels $F^4$ fastened on the shaft and the spring pressed pawls $F^5$ carried by the dials. Consequently, upon setting up the multiplier digits, the multiplier dials are turned in a clockwise direction, as viewed from above, whereas upon rotation of the multiplier clutches in the reverse direction, as will be noted later, the pawls slide over the teeth of their ratchet wheels and do not disturb the initial setting. Thus the multiplier setting is exposed to view until the machine is cleared and therefore it is visible together with the multiplicand and product, so that the factors may be checked and the product read at the end of the multiplication. It is obvious that the same result would be obtained by loosely mounting the multiplier clutch and connecting it with the shaft by a pawl and ratchet, while then the multiplier dial would be fastened to the shaft. So far as I am aware this feature is broadly new and therefore the claims in connection therewith should be broadly interpreted.

The indentation member D is loosely mounted on the drum shaft and carries the multiplier actuating clutch $F^6$ as well as the multiplicand clutches. On the lower end of the shaft $F^7$ is fastened the gear $F^8$ which is turned through one of its teeth, or one-tenth of a complete rotation, during the passage of each multiplier pin $F^9$ firmly fastened to the drum. There is shown one multiplier pin for each series of drum teeth and each one is so located that just before the series of drum teeth start to pass the multiplicand gears, and just after the last transfer operation has been completed, the gear $F^8$ and multiplier actuating clutch $F^6$ are turned through one-tenth of a rotation by the pin $F^9$. (Fig. 17). When the number of series of drum teeth for which the engaging multiplier clutch is set has passed each multiplicand gear and just after the last transfer is completed, the cam $F^{10}$ on that multiplier clutch is in contact with the cam $F^{11}$ firmly mounted on the indentation member D, and the next multiplier pin is ready to turn the gear $F^8$ through another tooth. Then when the drum is forced further the cam $F^{10}$ forces the cam $F^{11}$ downward, thereby depressing the indentation member D against the action of the spring $D^1$. In this way, the multiplier actuating clutch and all the multiplicand clutches are depressed out of engagement and the jaws of the indentation clutch $D^2$ are locked, whereupon the indentation member will be turned with the drum since the lower part of the indentation clutch is fastened to the drum while the upper part is fastened to the indentation member at $D^3$. The drum is then allowed to rotate further but the indentation member is held in its depressed position by the pins $D^4$ which then ride on the bottom of the serrated edge of the member $D^6$. This member is fastened to the shelf plate $B^5$ by screws $D^7$ while the pins $D^4$ are carried by the indentation member. When the multiplicand members and the multiplier actuating clutch have been turned to the next clutches, the pins $D^4$ are opposite the next slots in the member $D^6$, so that the indentation member D is then forced upward by the spring $D^1$ until the multiplicand clutches engage the series of product clutches of next higher denomination and the multiplier actuating clutch engages the multiplier clutch of next higher denomination. In this way, the process of indentation is effected so that the partial products of the multiplicand and each multiplier digit are added in their proper denominational relation on the product wheels. The spring pressed serrated wheels $F^{12}$ and $F^{13}$ hold the multiplier actuating clutch and the multiplier clutches in their proper positions when out of engagement so that they nicely engage at the end of the indentation process and also permit free rotation of their shafts in both directions.

By setting up the multiplicand and the multiplier so that their digits of lowest denomination are set up on the respective members of lowest denomination, the product digits of lowest denomination will always be located at the extreme right of the product line, thus eliminating the possibility of including one or more zeros at the end of the indicated and printed items. However, the factors may be set up in their natural order, progressing from left to right, since the denominational order may be indicated above the respective buttons, as shown in Fig. 1. At the beginning of every problem the multiplicand clutch of lowest denomination engages the product clutch of lowest denomination and then the multiplicand is successively multiplied by the multiplier digits in their denominational order starting with the lowest. If desired, this process may be reversed whereupon it would be necessary to reverse the direction of movement of the indentation member, while the direction of rotation of the drum could also be reversed if desired.

If desired, I could allow my machine to operate to its limit in all problems irrespective of the number of multiplier digits, but I disclose herein means for stopping the machine as soon as the operation on the last multiplier digit is completed, except when the multiplier contains but one digit whereupon one indentation is effected before the machine is stopped. The means for accomplishing this result will now be described. (Figs. 12, 13 and 14). Upon setting any multiplier member, except the one of lowest denomination, to any multiplier digit other than 0, the multiplier clutch having a peripheral depression $F^{14}$ is turned from its zero position so that the projection $F^{15}$ of the estopment bar $F^{16}$ is held out of its normal position against the action of the springs $F^{17}$, thereby swinging outward about the pivot $F^{18}$ that estopment bar and all those corresponding to lower denominations as a result of the pins $F^{19}$, as shown in dotted lines on Fig. 12. However, the estopment bar of next higher denomination will not be swung out, so that the cam $F^{10}$ on each multiplier clutch of lower denomination than the highest set up is allowed to depress the cam $F^{11}$ on the indentation member D but is stopped therefrom and rigidly held by the extension $F^{20}$ when the machine attempts to proceed beyond the multiplier digit of highest denomination set up. The cam $F^{10}$ on the multiplier member of highest denomination is of such form as not to depress the indentation member when in contact with the cam $F^{11}$, so as to always stop the machine when the maximum range of multiplier digits have been used. Therefore the machine operates from the lowest denomination through the multiplier digit of highest denomination notwithstanding the contingency that all the multiplier digits except the first from the left may be 0. As the cams $F^{10}$ are returned to their zero positions during multiplication, the springs $F^{17}$ draw the estopment bars back in succession to their normal positions, as indicated in the full lines of Fig. 12. So far as I am aware this principle is broadly new and the claims in connection therewith should be broadly interpreted. The reason for omitting the estopment bar from the multiplier member of lowest denomination will be explained later.

It is apparent that instead of moving the multiplicand members and the multiplier actuating clutch around the drum shaft during indentation, the product members could be so moved either with the multiplier members or alone, but the means herein disclosed are preferred.

It is apparent that the mechanism could be actuated by a handle fastened to the drum shaft and turned by hand, and also the indentation could be effected by hand. In this way the motor, the means for automatically stopping the machine, and the means for automatically indenting the partial products could be eliminated, but the important feature of continuous automatic operation as herein disclosed would not be obtained. After setting the multiplicand and multiplier numbers, the operating cam H is pulled back, thereby pressing inwardly the rod $H^1$ against the action of spring $H^2$ and at the same time removing the spring pressure at the engaging tooth $H^3$. (Fig. 16). The rod $H^1$ is guided in its movement by the pin $H^4$ of the rod and a slot in the handle, and it carries a pin $H^5$ which is adapted to turn the lever $H^6$ about its pivot $H^7$. Simultaneously the rod $H^1$ presses down the right hand side of the lever $H^8$ pivoted at $H^9$, thereby disengaging the tooth $H^3$ and forcing the lever $H^8$ into that position where the projection $H^{10}$ rests in the depression $H^{11}$ of the spring $H^{12}$. The handle $H^{13}$ is fastened to the gear $H^{14}$ and is loosely pivoted on the drum shaft $B^2$. The inner end of the main spring $H^{15}$ is fastened to the drum shaft at $H^{32}$ (Fig. 8), while its other end is fastened to the adjusting block $H^{18}$. This block is adapted to be moved in the slot $H^{19}$ and to be adjusted therein by means of the thumb screw $H^{20}$, so as to regulate the main spring in accordance with the efficient speed of operation of the machine. The ratchet wheel $H^{16}$ is fastened to the drum shaft while the spring pressed pawl $H^{17}$ engaging therewith is fastened to the drum, so that upon rotation of the drum shaft in anticlockwise direction, viewed from above as indicated by the arrow in Fig. 16, the drum is synchronously rotated, whereas upon the reverse movement the pawl slides over the ratchet teeth. When the main spring is free to unwind it turns the drum shaft and by means of the reducing gears $H^{21}$ tightly mounted and $H^{22}$ loosely mounted on the drum shaft and the connected gears $H^{23}$ and $H^{24}$ loosely mounted on $H^{25}$, the handle $H^{13}$ is slowly moved in the direction of the arrow of Fig. 16 along the slot $H^{20}$ in the casing until the motor is automatically stopped as described above.

To rewind the motor the handle $H^{13}$ is pulled back from the position it assumes at the completion of the multiplication to that position shown in the drawings, whereupon the lever $H^6$ will have turned the lever $H^8$ until the tooth $H^3$ is engaged and the projection $H^{10}$ rests in the depression $H^{26}$ of the spring, thereby preventing the operation of the main spring until the operating cam is again actuated. Therefore, it is necessary that the main spring be restored to its fully operative condition after each multiplication and that the items be printed and the machine cleared, as will be noted later, for unless the handle is pulled all the way back, the spring will immediately unwind.

In order to adjust the speed of the multiplier drum, I provide a serrated annulus $H^{27}$ secured to the drum and a roller $H^{28}$ pressed by the spring $H^{29}$ which may be adjusted by the set screw $H^{30}$. These devices also force the drum to stop in a correct position after each operation. The serrated segment $H^{31}$ and a spring pressed roller, the pressure being adjustable as described above, similarly control the movement of the indentation member during the process of indentation.

Upon rewinding the motor, the multiplicand, multiplier and product are printed on a slip of paper in three lines, each being designated in a characteristic manner, as shown in Fig. 2. The multiplicand printing wheels J are set to the multiplicand digits upon turning the multiplicand buttons, by means of the bevel gears $J^1$, the shafts $J^2$ which extend through the bearings $J^3$, and the bevel gears $J^4$. (Figs 8 and 21.) The multiplier printing wheels $J^{50}$ are similarly set to the multiplier digit by means of the gears $J^5$, and the shafts $J^6$. The product printing wheels $J^7$ are turned by the product indicating wheels by means of the gears $E^{14}$ fastened on the sleeve $E^{16}$ with the product wheels E, the gears $J^8$ loosely mounted on the shaft $J^9$ and the gear $J^{10}$ fastened to the product printing wheels. The multiplicand, multiplier and product printing wheels are loosely mounted on their shafts $J^{11}$, $J^{12}$ and $J^{13}$, respectively, and each wheel carries figure type 0 to 9 consecutively arranged around its periphery, as indicated in Fig. 20.

When the multiplication is completed, the printing type wheels present the proper digits to be printed. A strip of paper $J^{14}$ is now, or prior to the multiplication, fully inserted in the slot $J^{15}$ of the casing. Just before the indentation member reaches its normal position in the resetting operation, as will be described later, the pin $J^{16}$ on the indentation member strikes the pawl $J^{17}$ which consists of two parts pivoted at $J^{18}$ in an opening of the shelf plate. (Fig. 8.) The lower part of the pawl $J^{17}$ has an end projection while the upper part carries a pin so arranged that the lower part is moved alone when the pin $J^{16}$ strikes it during multiplication, while the upper part is brought out of engagement with the ratchet wheel $J^{19}$ during resetting of the indentation member. The spring $J^{22}$ is then free to turn the shaft $J^{21}$ on which the ratchet wheel is fastened so that the bent rod $J^{20}$, attached at both ends to the shaft $J^{21}$, allows the spring $J^{22}$ to operate all the printing hammers $J^{23}$ fastened on the shaft $J^{51}$.

I show means for preventing the printing of zeros before the first significant figure of the product only, but similar means may also be used for the multiplicand and multiplier, as will be readily understood. Each product printing wheel $J^7$ carries a cam with a sloping surface at $J^{24}$, so that upon movement of any product wheel from zero, the bent lever $J^{25}$ pivoted at $J^{26}$ is moved, thereby moving between the guide pins $J^{28}$ its connected arm $J^{27}$ and all those of lower denominations. (Figs. 19 and 20.) Each lever carries a cover plate $J^{29}$ which normally covers the opening $J^{30}$, but uncovers the opening when its lever or any one of higher denominations is actuated. When the printing hammers are operated, they strike the cover plates over the openings not uncovered, but pass through those that are uncovered and smartly strike the paper $J^{14}$ against the inked ribbon $J^{32}$ and the type wheels to simultaneously print the items. The perforated plate $J^{31}$ prevents smearing of the paper. Immediately after the printing hammers have operated, the pin $J^{16}$ on the indentation member comes into contact with the arm $J^{33}$ loosely mounted on the shaft $J^{21}$, and by means of a pin and slot connection to the ratchet wheel $J^{19}$ pulls all the printing hammers down to their normal position shown in Fig. 8. During multiplication the arm $J^{33}$ is moved to the right without actuating the ratchet wheel $J^{19}$ by reason of the pin and slot connection. In this way the multiplicand, multiplier and product are printed without preceding zeros, notwithstanding the contingency that any item may contain any number of zeros following the digit of highest denomination. If the multiplier contains but one digit then the indentation member automatically advances after the multiplication operation to the position for multiplication by a second digit, since there is no estopment bar on the multiplier members of lowest denomination, as previously mentioned. However, the machine will then be automatically stopped by the estopment bar corresponding to the second lowest denomination, which, essentially, comes into engagement immediately after the multiplication operation.

The inked ribbon $J^{32}$ is wound on two spools $J^{34}$ and travels just under the type wheels. (Figs. 18 and 22). One spool is driven at a time by means of the shaft $J^{35}$ carrying at its end the bevel gears $J^{36}$. This shaft is turned from the multiplier member of lowest denomination, so as to operate during every problem, by means of the gear $J^{37}$, an intermediate gear hidden just behind it in Fig. 22, and the gear $J^{38}$ which turns the shaft by a feather and groove connection at $J^{39}$. One or the other bevel gears $J^{36}$ engages with a similar gear $J^{40}$ on the spool shaft $J^{41}$ until the inked ribbon of one spool is wound to a predetermined diameter, whereupon the bell crank $J^{42}$ is pushed down sufficiently so that the catch $J^{43}$ releases the lever $J^{44}$. Then the spring $J^{45}$ fastened to the loose collar $J^{46}$ pulls the lever $J^{44}$ and therefore the shaft $J^{35}$ by means of the splined collar $J^{47}$ until the other bevel gears engage to move the inked ribbon in the opposite direction. During the reversing operation, the shaft $J^{35}$ slides axially through the actuating gear $J^{38}$ which is continually held in an engagement by the arm $J^{48}$. In order to properly carry the inked ribbon from the spool into its position under the printing wheels, it is guided over pins $J^{49}$ and other pins not shown, as indicated by the broken lines in Fig. 18.

The actuating devices for clearing the machine or setting the members to zero are carried by the indentation member at such positions that just before the indentation member is brought back to its normal position during the rewinding operation, the items are printed and then everything is cleared. The method for returning the indentation member to its normal position will now be described. (Figs. 7 and 15). The member K with cams $K^1$ is loosely mounted on the drum shaft and carries a spring pressed pawl $K^2$ which engages a ratchet wheel $K^3$ fastened on the drum shaft $B^2$. During the multiplication operation the pawl slips over the ratchet teeth, but upon rotation of the drum shaft in the direction of the arrow in Fig. 15 during the clearing operation, the member K is rotated, whereupon the pin $K^4$ is pressed down against the action of the spring $K^5$, thereby depressing the indentation member D until the clutch members $D^2$ come into engagement. At the same time one of the six slots $K^6$ engages with the key $K^7$ on the drum shaft (Fig. 8) so that the indentation member is turned back with the multiplier drum and the drum shaft. The indentation member is prevented from rising by the pins $D^4$ and the serrated member $D^6$ until it reaches its normal position, when the indentation member is free to rise at one side of the pin $K^4$, as indicated in Fig. 12. By these means the indentation member, together with the multiplicand members and multiplier actuating member, are returned from any position at which they may have stopped to their normal positions, whereas the previously described operations during the multiplication process are in nowise interfered with. The members $C^{10}$ will then engage with their respective forks $C^9$ ready to cause the multiplicand gears to be raised to their zero position, if desired.

Just after the printing operation, the multiplier dials and multiplier type wheels are cleared by the following means. (Figs. 4, 12 and 18). Fastened on the multiplier dials $F^3$ are the cams L, which are adapted to be turned from any position to their zero position shown in Fig. 4, by means of the sliding member $L^1$ with properly shaped edged depressions $L^2$. Depending from the member $L^1$ and guided by the bearings $L^3$ is the rod $L^4$ which pushes the spring pressed latch $L^5$ away during multiplication but which is caught thereby during the rewinding operation. In this way the rod $L^4$ is pulled along throughout the full travel of the member $L^1$ in the direction of the arrow in Fig. 4, whereby all the multiplier dials are returned to their normal or zero position. At the proper point the pin $L^6$ pushes the latch $L^5$ out of engagement with the rod $L^4$ which is then returned with the member $L^1$ by the spring $L^7$. The multiplier cams $F^{10}$ are individually reset as a result of the multiplication operation.

By similar means the multiplicand dials, gears and type wheels are reset to their normal positions. If, however, the multiplicand setting is to be retained, the rod M is pulled up by the handle $M^2$ so that the spring $M^3$ rests in a depression $M^4$. Then the rod M will not be engaged by the catch $M^5$ during the rewinding operation and the member $M^6$ will not be actuated to turn the cams $M^7$ which are fastened on the multiplicand shafts $C^6$. When it is desired to reset the multiplicand gears and dials to their normal positions, the member $M^6$ may be actuated by hand by pulling the handle $M^2$ along the slot M⁸ in the cover. (Fig. 1). If the multiplicand members are automatically reset, the pin M⁹ releases the rod M from engagement with the catch M⁵ when the sliding member M⁶ has been moved sufficiently to reset the multiplicand gears and dials to zero. The spring M¹⁰ then pulls the member M⁶ back to its normal position.

The product indicating and type wheels are cleared by means of the member N and the pivoted lever N¹ having a toothed segment N² which engages the gear N³ on the shaft E¹⁷ and thereby causes the spring pressed pawls N⁴ fastened to the product wheels E to engage the peripheral depression N⁵ in the wheels N⁶ (Figs. 6 and 18). The depressions N⁵ are so shaped that upon rotation of the wheels N⁶ in the reverse direction to that of the arrows of Fig. 6, which occurs during the first indentation in the multiplication operation, the pawl N⁴ rides out of it without locking the two wheels together. However, during the clearing operation, the two are locked together at some part of the rotation, irrespective of the position of the product wheels, and then the product wheel is returned to zero by moving the toothed segment N² farther in the direction of its arrow in Fig. 18. When the indentation member advances from the position corresponding to the multiplier digits of lowest denomination, the lever N¹ is pulled by the spring N⁷ to the position indicated by the dotted lines in Fig. 12, ready to be actuated as noted above upon resetting the indentation member.

Upon movement of the cover plates J²⁹ to permit the operation of the printing hammers, the member P is pushed to the right in Fig. 18, turning the bell crank P² about its pivot P³. The nose P⁴ is thus forced into the path of the pin P⁵ so that, at the end of the return movement of the indentation member D, the bell crank P² is pushed up thereby resetting all the cover plates J²⁹ to their normal positions wherein they cover the respective openings in the plate J³¹. The spring P¹ holds the bell crank in its upright position after the pin P⁵ has moved away during the multiplication operation.

It is obvious that my machine may be modified in many particulars without departing from the essential features disclosed herein and therefore I nowise limit myself to the specific construction shown. It is apparent that the actuating teeth may be carried by a member of different form, or by an endless belt or chain instead of by the described drum, the important thing being that the multiplicand gears may be repeatedly turned during one passage of all the drum teeth; also the multiplicand and multiplier indicators may be linearly disposed by employing transmitting means similar to those shown for the product indicators or for the multiplicand and multiplier type wheels; furthermore, bevel spur or other gears may be used in place of the multiplicand, multiplier or product clutches.

Having thus described my invention, what I claim is:

1. In a calculating machine having an adding mechanism, means for setting up a multiplicand factor, means for setting up a multiplier factor having more than one digit, means including a motor for automatically effecting the multiplication of said factors, and means positioned by the multiplier setting means for automatically stopping said motor upon completion of the multiplying operation; substantially as described.

2. In a calculating machine, an adding mechanism, a member forming one element having a plurality of relatively fixed actuating means arranged in lines containing different numbers thereof, a plurality of gears forming a second element and adapted to be axially rotated upon engagement with said actuating means, and transmitting connections from said gears to said adding mechanism, one of said elements being adapted to move in order to axially rotate said gears and thereby advance said adding mechanism; substantially as described.

3. In a calculating machine, an adding mechanism comprising a plurality of denominations, a member having a plurality of circularly disposed series of actuating means, and transmitting mechanism from said member to said adding mechanism, each of said series being adapted to coöperate with said transmitting mechanism to effect the registration of 0 to 9 digits on a denomination of said adding mechanism.

4. In a calculating machine, an adding mechanism comprising a plurality of denominations, a member having a plurality of series of actuating means fixed with respect to each other, and transmitting mechanism adapted to coöperate with each of said series to effect the registration of 0 to 9 digits on a denomination of said adding mechanism.

5. In a calculating machine, an adding mechanism, a member having a plurality of series of actuating means wherein each series comprises 1 to 9 of said actuating means in circular alinement with 1 to 9 respectively of the remaining series, and transmitting mechanism adapted to advance said adding mechanism upon engagement with said actuating means.

6. In a calculating machine, an adding mechanism, a rotatable member having a plurality of series of actuating means, and transmitting mechanism adapted to coöperate with each of said series upon rotation of said member to effect the registration of 0 to 9 digits on a denomination of said adding mechanism.

7. In a calculating machine, an adding mechanism, a rotatable drum having a plurality of series of peripherally disposed actuating means, and transmitting mechanism adapted to coöperate with each of said series upon rotation of said drum to effect registration of 0 to 9 digits upon a denomination of said adding mechanism.

8. In a calculating machine, an adding mechanism, a rotatable drum having a plurality of series of stepped teeth arranged around the periphery thereof, and transmitting mechanism between said drum and said adding mechanism, each of said series comprising teeth from 1 to 9 units length adapted upon rotation to coöperate with said transmitting mechanism to advance a denomination of said adding mechanism 1 to 9 digits.

9. In a calculating machine, an adding mechanism, a member having a plurality of series of circularly disposed actuating means, transmitting mechanism coöperating with said actuating means to advance said adding mechanism, and a plurality of non-operative spaces alternating with said series on said member wherein said transmitting mechanism is not actuated.

10. In a calculating machine, a plurality of result indicators, transfer devices therefor, a member having actuating means simultaneously coöperative with transmitting mechanism to actuate said indicators and also having other actuating means adapted to coöperate with other transmitting mechanism to actuate said transfer devices.

11. In a calculating machine, a plurality of result indicators and transfer devices therefor, a member having a plurality of series of actuating means wherein each series comprises a plurality thereof, transmitting mechanism coöperating with said actuating means to advance said indicators, a transfer member having other actuating means, and other transmitting mechanism coöperating with said transfer member to actuate said transfer devices.

12. In a calculating machine, a plurality of result indicators and transfer devices therefor, a member having a plurality of series of relatively fixed actuating means and a plurality of non-operative spaces alternating with said series, transmitting mechanism coöperating with said actuating means to advance said adding mechanism, a transfer member having other actuating means, and other transmitting mechanism coöperating with said transfer member to actuate said transfer devices when said indicators are not being advanced by its actuating means.

13. In a calculating machine, a plurality of result indicators and transfer devices therefor, a multiplier member having a plurality of circularly disposed series of actuating means and a plurality of non-operative spaces alternating therewith, transmitting mechanism coöperating with said actuating means to advance said indicators, a transfer member having a plurality of series of actuating means and a plurality of non-operative spaces alternating therewith, and other transmitting mechanism coöperating with the actuating means of said transfer member to actuate said transfer devices, the arrangement being such that the actuation of the indicators by the multiplier member is adapted to occur alternately with the actuation of the transfer devices by the transfer member.

14. In a calculating machine, a rotatable drum having a plurality of series of teeth and a plurality of depressed blank spaces alternating with said series, a plurality of transfer teeth, a transfer gear, and a plurality of actuating gears, said transfer gear engaging with said transfer teeth only when said actuating gears are in said blank spaces, whereby the transfer operation is performed when the actuating gears are inoperative.

15. In a calculating machine, a plurality of plates, a plurality of series of teeth circumferentially disposed on the periphery of each of said plates, a plurality of depressed blank spaces alternating with said series, and means for holding said plates together whereby said teeth and said spaces are in alinement.

16. In a calculating machine, the combination with an adding mechanism and transmitting mechanism thereto, of a multiplier member built up of a number of plates having actuating means adapted to coöperate with the transmitting mechanism and being so arranged that there is formed a plurality of series of said actuating means and a plurality of non-operative spaces alternating with said series.

17. In a calculating machine, the combination with an adding mechanism and transmitting mechanism thereto, of a multiplier member built up of superposed annuli having actuating means adapted to coöperate with the transmitting mechanism and being so arranged that there is formed a plurality of peripherally disposed series of 1 to 9 of said actuating means and a plurality of non-operative spaces alternating with said series.

18. In a calculating machine, the combination with a plurality of result indicators and transfer devices therefor, and transmitting mechanism to the indicators and the transfer devices, of a member built up of a number of plates having actuating means arranged to form a plurality of series thereof for coöperating with the transmitting mechanism to the indicators and a plurality of series thereof for coöperating with the transmitting mechanism to the transfer devices.

19. In a calculating machine, the combination with a plurality of result indicators and transfer devices therefor, and transmitting mechanism to the indicators and the transfer devices, of a member built up of superposed annuli having peripheral actuating means arranged to form a plurality of series thereof for coöperating with the transmitting mechanism to the indicators and a plurality of series thereof coöperating with the transmitting mechanism to the transfer devices, and means for holding said annuli in fixed relative position.

20. In a calculating machine, the combination with a rotatable drum having a plurality of series of teeth circumferentially disposed on its periphery and a plurality of depressed blank spaces alternating with said series, of a transfer plate having a plurality of teeth circumferentially disposed on its periphery, and a plurality of depressed blank spaces alternating with said last named series, and means for holding said drum and said plate together so that said teeth and said spaces maintain a fixed relative position.

21. In a calculating machine, a plurality of annuli superposed to form a hollow drum, a plurality of series of teeth circumferentially disposed on the periphery of said annuli, a plurality of depressed blank spaces alternating with said series, and means for holding said annuli together, whereby a plurality of series of elongated stepped teeth alternating with a plurality of series of elongated depressed blank spaces are formed on said drum.

22. In a calculating machine, an adding mechanism, a rotatable member having a plurality of like series of actuating means, and transmitting mechanism to said adding mechanism including a gear adapted to engage said actuating means and thereby advance said adding mechanism through a like amount during the passage of each of said series.

23. In a calculating machine, an adding mechanism, a member having a plurality of actuating means arranged in lines containing different numbers thereof including some greater than 9, transmitting mechanism to the adding mechanism including a gear adapted to engage any line of said actuating means and thereby actuate the adding mechanism through predetermined amounts sometimes more than 9 digits, and means for positioning said gear relatively to said member.

24. In a calculating machine, an adding mechanism, a rotatable member having a plurality of actuating means arranged in circles containing different numbers thereof including some greater than 9, transmitting mechanism to the adding mechanism including a gear adapted to engage any circle of said actuating means and thereby actuate the adding mechanism through predetermined amounts sometimes more than 9 digits in one rotation of said member, and means for positioning said gear relatively to said member.

25. In a calculating machine, an adding mechanism, a rotatable drum having different numbers of actuating means circumferentially disposed on the periphery thereof including some circles with more than 9 actuating means, transmitting mechanism to the adding mechanism including an axially rotatable gear adapted to engage any circle of said actuating means and thereby actuate the adding mechanism through predetermined amounts sometimes more than 9 digits in one rotation of said drum, and means for moving said gear parallel to the axis of said drum to bring it in line with any predetermined circle of said actuating means.

26. In a calculating machine, a plurality of result indicators, transfer devices therefor, a member having actuating means arranged in lines of different numbers thereof, transmitting mechanism including a gear adapted to coöperate with said actuating means to actuate an indicator, a transfer member having other actuating means, and other transmitting mechanism including another gear adapted to coöperate with the actuating means of said transfer member to actuate said transfer devices.

27. In a calculating machine, a plurality of result indicators, transfer devices therefor, a member having actuating means arranged in lines of different numbers thereof and having a non-operative space, transmitting mechanism, including a gear adapted to coöperate with said actuating means to actuate an indicator, a transfer member having other actuating means, other transmitting mechanism including a gear adapted to coöperate with the actuating means of said transfer member to actuate said transfer devices when the first-mentioned gear is in said non-operative space, and means for positioning the first-mentioned gear relatively to its actuating means to actuate an indicator through predetermined amounts.

28. In a calculating machine, a rotatable member, a plurality of axially rotatable devices, and a plurality of series of actuating means carried by said member adapted to simultaneously rotate said devices.

29. In a calculating machine, the combination with a member having a plurality of series of teeth, of a plurality of axially rotatable gears disposed on the arc of a circle, the angular spacing of said gears being equal to the angular spacing of said series of teeth.

30. In a calculating machine, an adding mechanism, a member having a plurality of circularly disposed actuating means, a plurality of gears capable of simultaneously engaging said actuating means throughout the same period, and transmitting mechanism from said gears to said adding mechanism.

31. In a calculating machine, an adding mechanism, a member having a plurality of relatively fixed actuating means arranged in lines containing different numbers thereof, a plurality of gears capable of simultaneously engaging said actuating means throughout the same period, and transmitting mechanism from each of said gears to different denominations of said adding mechanism.

32. In a calculating machine, an adding mechanism, a member having a plurality of relatively fixed series of 1 to 9 actuating means, a plurality of gears so arranged that each one engages with a different series of said actuating means at any given time, and transmitting mechanism from said gears to said adding mechanism.

33. In a calculating machine, an adding mechanism, a rotatable member having a plurality of series of actuating means circularly disposed in spaced relation, a plurality of circularly disposed gears arranged in the same spaced relation as the series of actuating means and adapted to engage therewith upon rotation of said member, and transmitting mechanism from each of said gears to a different denomination of said adding mechanism.

34. In a calculating machine, an adding mechanism, a member having actuating means, a gear adapted to be moved bodily longitudinally of said member and also adapted to be axially rotated by said actuating means at different points to which it may be moved, and transmitting mechanism from said gear to said adding mechanism.

35. In a calculating machine, a drum having actuating means, a gear adapted to be moved bodily through an angle around the circumference of said drum and also adapted to be axially rotated by said actuating means at different positions of the arc through which it may be moved, and transmitting mechanism from said gear to said adding mechanism.

36. In a calculating machine, an adding mechanism, a drum having actuating means, a plurality of gears adapted to be bodily moved collectively through an angle around the circumference of said drum and also adapted to be axially rotated independently of one another by said actuating means at different positions of the arc through which they may be moved, and transmitting mechanism from said gears to said adding mechanism.

37. In a calculating machine, an adding mechanism comprising a plurality of denominations, a member having actuating means, a gear adapted to be actuated by said actuating means, transmitting mechanism from said gear to said adding mechanism, and means for successively moving said gear into engagement with several denominations of said adding mechanism.

38. In a calculating machine, an adding mechanism comprising a plurality of denominations, a member having actuating means arranged in lines of different numbers thereof, a gear adapted to engage any line of said actuating means, and transmitting mechanism from said gear adapted to be moved into engagement with different denominations of said adding mechanism in order to register a predetermined line of actuating means with a predetermined denomination of said adding mechanism.

39. In a calculating machine, an adding mechanism comprising a plurality of denominations, a plurality of actuating means arranged in lines of different numbers thereof, a plurality of gears each adapted to engage with the several lines of actuating means, and transmitting mechanism from each of said gears adapted to be moved simultaneously with the transmitting mechanism from the remaining gears from engagement with one series of denominations to engagement with another series of denominations of said adding mechanism in order to register predetermined lines of said actuating means with predetermined denominations of said adding mechanism.

40. In a calculating machine, an adding mechanism comprising a plurality of denominations, a rotatable member having actuating means arranged in circles of different numbers thereof, a gear adapted to engage any circle of said actuating means, and transmitting mechanism from said gear adapted to be moved from engagement with one denomination to engagement with another denomination of said adding mechanism in order to actuate a predetermined denomination of said adding mechanism from a predetermined circle of actuating means upon rotation of said member.

41. In a calculating machine, an adding mechanism, a member having actuating means, transmitting mechanism adapted to register said actuating means with said adding mechanism and including coöperative clutch parts adapted to be pressed out of engagement with each other to disconnect said member from said adding mechanism.

42. In a calculating machine, an adding mechanism comprising a plurality of denominations, a member having actuating means, a gear adapted to engage said actuating means, transmitting mechanism from said gear to a denomination of said adding mechanism, and means for moving said gear in the line of travel of said actuating means in order to connect it with another denomination of said adding mechanism.

43. In a calculating machine, an adding mechanism comprising a plurality of denominations, a drum having actuating means arranged in a circle about its periphery, a plurality of gears adapted to engage said actuating means, transmitting mechanism from said gears to several denominations of said adding mechanism, and means for collectively moving said gears in an arc concentric with the periphery of said drum in order to engage them with other denominations of said adding mechanism.

44. In a calculating machine, an adding mechanism comprising a plurality of denominations, a rotatable member having actuating means arranged in lines of different numbers thereof, a gear adapted to be positioned to engage with a predetermined line of said actuating means in accordance with a digit of one factor to be multiplied, transmitting mechanism from said gear to said adding mechanism, means for turning said member in accordance with a digit of the other factor to be multiplied and means for moving said gear from engagement with one denomination to engagement with another denomination of said adding mechanism to effect indentation of the results.

45. In a calculating machine, an adding mechanism comprising a plurality of denominations, a rotatable member having a plurality of series of 1 to 9 actuating means circumferentially disposed in different lines about its periphery, a plurality of gears adapted to be independently positioned to engage with predetermined lines of said actuating means in accordance with the several digits of one factor to be multiplied, transmitting mechanism from said gears to a series of denominations of said adding mechanism, means for turning said member in accordance with each digit of the other factor to be multiplied, and means for collectively moving said gears from engagement with one series to engagement with another series of denominations of said adding mechanism to effect indentation of the partial results.

46. In a multiplying machine, a plurality of multiplicand clutches disposed in a curved line, a greater plurality of product clutches, and means for collectively moving said multiplicand clutches into successive coöperation with said product clutches.

47. In a calculating machine, an adding mechanism, a member having actuating means, a gear adapted to be axially rotated upon engagement with said actuating means, transmitting mechanism from said gear to said adding mechanism, and means for locking said member and said gear together during the period of indentation in order to move said gear into engagement with another denomination of said adding mechanism without axially rotating said gear.

48. In a calculating machine, an adding mechanism comprising a plurality of denominations, a rotatable member having actuating means, a plurality of gears adapted to be axially rotated independently of one another by said actuating means, transmitting mechanism from said gears for actuating said adding mechanism during rotation of said member, and means for locking said member and said gears together during the period of indentation in order to move said gears into engagement with other denominations of said adding mechanism without axially rotating said gears.

49. In a calculating machine, an adding mechanism, a member having actuating means arranged in lines containing different numbers thereof, a gear adapted to engage said actuating means, transmitting mechanism from said gear to said adding mechanism, a rotatable shaft, transmitting mechanism from said shaft to said gear, and means for turning said shaft in order to move said gear to a predetermined line of said actuating means in accordance with a digit of one factor to be set up.

50. In a calculating machine, an adding mechanism, a member having actuating means arranged in lines containing different numbers thereof, a gear adapted to engage said actuating means, transmitting mechanism from said gear to said adding mechanism, a rotatable shaft, transmitting mechanism from said shaft to said gear, means for turning said shaft in order to move said gear to a predetermined line of said actuating means in accordance with a digit of one factor to be set up, and an indicator actuated by said shaft to indicate the position of said gear.

51. In a calculating machine, an adding mechanism, a member having actuating means arranged in lines containing different numbers thereof, a gear adapted to be actuated by said actuating means, transmitting mechanism to advance said adding mechanism upon rotation of said gear, a shaft for positioning said gear to a predetermined line of said actuating means, and a detachable connection between said shaft and said gear so that said gear may be disconnected from said shaft.

52. In a calculating machine, an adding mechanism, a member having actuating means arranged in circles containing different numbers thereof, a gear adapted to engage said actuating means, transmitting mechanism from said gear to said adding mechanism, an indicator, setting means for moving said gear to engage a predetermined circle of said actuating means and for actuating said indicator in accordance with a digit of a factor to be set up, said means including a detachable part between said gear and said indicator in order that said gear may be moved out of connection therewith.

53. In a calculating machine, an adding mechanism comprising a plurality of indicators arranged to show a result in a straight line, a member having actuating means arranged in lines containing different numbers thereof, a plurality of gears arranged in a curved line and adapted to be independently moved to the several lines of said actuating means to be actuated thereby, and transmitting mechanism from said gears to said adding mechanism for transmitting the axial rotation of said gears to the indicators of said adding mechanism.

54. In a calculating machine, an adding mechanism, a rotatable member having actuating means, transmitting mechanism adapted to advance said adding mechanism upon actuation by said actuating means, a rotatable shaft adapted to be actuated by said member, a cam actuated by said shaft and adapted to be positioned in accordance with a digit of one factor to be multiplied, and a stop coöperating with said cam to limit the amount of rotation of said shaft in accordance with the digit set up.

55. In a calculating machine, an adding mechanism, a rotatable member having actuating means, transmitting mechanism adapted to advance said adding mechanism upon actuation by said actuating means, a plurality of rotatable shaftst adapted to be actuated one at a time by said member, cams actuated by the individual shafts and adapted to be positioned in accordance with the individual digits of one factor to be multiplied, and a stop coöperating with said cams to disengage the respective shaft and the driving connection from said member when said member is rotated through an amount determined by the digit set up on that shaft.

56. In a calculating machine, a rotatable drum, a plurality of multiplier pins on said drum, and a multiplier actuating member adapted to be turned by said pins upon rotation of said drum.

57. In a calculating machine, a rotatable drum, a plurality of series of teeth on said drum, a plurality of multiplier pins, and a multiplier actuating member adapted to be turned through like extents by each of said pins upon rotation of said drum.

58. In a calculating machine, a rotatable drum, a plurality of multiplier pins, a multiplier actuating member adapted, upon rotation of said drum, to be turned through like extents by each of said pins and to be lightly held in position after each turning operation.

59. In a multiplying machine, a rotatable drum having a plurality of series of teeth and a plurality of depressed blank spaces alternating with said series, a plurality of multiplier pins on said drum, a plurality of multiplier gears, and a multiplier actuating member, whereby, upon rotation of said drum, said pins engage said actuating member only when said gears are in said blank spaces.

60. In a multiplying machine, a rotatable drum having a plurality of series of teeth and a plurality of depressed blank spaces alternating with said series, a plurality of multiplier pins on said drum, a transfer plate having a plurality of series of transfer teeth and a plurality of depressed blank spaces alternating with said series of transfer teeth, a plurality of multiplicand gears, a multiplier actuating gear, and a transfer gear adapted to engage said transfer teeth, whereby, upon rotation of said drum, said pins engage said actuating member only when all of said gears are in their depressed blank spaces.

61. In a multiplying machine, an indentation member, a clutch carried by said member, a rotatable drum, a clutch carried by said drum, a spring adapted to normally hold said clutches out of engagement, the cams $F^{10}$ and $F^{11}$ adapted to force said clutches into engagement against the action of said spring, and means for holding said clutches in engagement until said member is moved by said drum through a predetermined angle.

62. In a multiplying machine, an indentation member, a clutch carried by said member, a rotatable drum, a clutch carried by said drum, a spring adapted to normally hold said clutches out of engagement, the cams $F^{10}$ and $F^{11}$ adapted to force said clutches into engagement against the action of said spring, and means for holding said clutches in engagement until said member is moved by said drum through a predetermined angle, whereupon said spring forces said clutches out of engagement.

63. In a multiplying machine, an indentation member, a clutch carried by said member, a rotatable drum, a clutch carried by said drum, a spring adapted to normally hold the first named clutch in its elevated position out of engagement with the second named clutch, a fixed member $D^7$, the pins $D^4$, and the cams $F^{10}$ and $F^{11}$ adapted to press said clutches into engagement against the action of said spring, so that, upon rotation of said drum, said indentation member is prevented from rising until said pins are opposite the next grooves in said member $D^4$, whereupon said spring forces said indentation member to its elevated position.

64. In a multiplying machine, an indentation member, a plurality of multiplicand clutches carried by said member, a greater plurality of product clutches adapted to engage said multiplicand clutches, and means for collectively moving said multiplicand clutches out of engagement with a like number of said product clutches.

65. In a multiplying machine, a plurality of multiplicand clutches, a greater plurality of product clutches adapted to engage said multiplicand clutches, means for collectively pressing said multiplicand clutches out of engagement with a series of like number of said product clutches, and means for collectively advancing said multiplicand clutches to another of said series.

66. In a multiplying machine, a plurality of multiplicand clutches, a greater plurality of product clutches adapted to engage said multiplicand clutches, means for collectively pressing said multiplicand clutches out of engagement with a series of like number of said product clutches, and means for collectively advancing said multiplicand clutches to the next of said series in the ascending order of denomination.

67. In a multiplying machine, a multiplier actuating clutch, a plurality of multiplier clutches adapted to engage one at a time with said actuating clutch, means for pressing said actuating clutch out of engagement and means for moving said actuating clutch into engagement with another multiplier clutch.

68. In a multiplying machine, a multiplier actuating clutch, a plurality of multiplier clutches adapted to engage one at a time with said actuating clutch, and means for moving said actuating clutch into engagement with said multiplier clutches in the ascending order of denominations starting with the one of lowest denomination.

69. In a multiplying machine, an indentation member, a multiplier actuating clutch carried by said member, a plurality of multiplicand clutches carried by said member, a plurality of multiplier clutches adapted to engage one at a time with said actuating clutch, a plurality of product clutches adapted to engage said multiplicand clutches, means for depressing said member to disengage all of said clutches, means for turning said member through a predetermined angle and then elevating it, whereupon said actuating clutch engages a multiplier clutch of next higher denomination and said multiplicand clutches engage a series of product clutches of next higher denomination.

70. In a multiplying machine, multiplicand members, multiplier members, means for setting said members to represent factors, means for performing the multiplication of said factors, product indicators to indicate the result of said multiplication, and means dependent upon said members determining the product indicator of lowest denomination.

71. In a calculating machine, an adding mechanism comprising a plurality of denominations, a member having actuating means, transmitting devices from said adding mechanism, transmitting devices adapted to be actuated by said actuating means and also adapted to engage a series of the transmitting devices from the adding mechanism, and means adapted to move the transmitting devices from said member out of engagement with a series of the transmitting devices from said adding mechanism and into engagement with another series thereof.

72. In a multiplying machine, an indentation member, a plate carried by said member, a cam acting against said plate, an adjustable spring acting on said cam, and means for adjusting said spring, whereby the movement of said indentation member during the process of indentation in multiplication may be adjusted in speed.

73. In a multiplying machine, multiplicand members, multiplier members, means for setting said members to represent factors, means for performing the multiplication of said factors, and printing devices adapted to print said factors and their product in superposed horizontal lines upon completion of the multiplication.

74. In combination with a multiplying machine comprising multiplicand members, multiplier members, means for setting said members to represent factors, and means for performing the multiplication of said factors, of printing means comprising a plurality of type wheels, actuating devices adapted to print from said wheels, and means for preventing the printing from those wheels of higher denominations than the highest denomination of the product of said factors, whereby no zeros are printed before the digit of highest denomination in the product.

75. In a multiplying machine, a multiplier drum, means for rotating said drum, a multiplier member, means for setting said member to represent a multiplier digit, means adapted to prevent further rotation of said member than that corresponding to said digit.

76. In a multiplying machine, a multiplier drum, an indentation member carrying a multiplier actuating member and a cam, a plurality of multiplier members adapted to engage one at a time with said actuating member, a plurality of cams adapted to contact one at a time with said stop upon a predetermined rotation of said drum thereupon disengaging said members, and a plurality of estopment bars each adapted to prevent the disengagement.

77. In a calculating machine having an adding mechanism and means for advancing said adding mechanism, a plurality of rotatable shafts adapted to be positioned in accordance with the digits of one factor to be multiplied, and a plurality of estopment bars $F^{16}$ controlled by respective ones of said members for the purpose described.

78. In a multiplying machine, the cams $F^{10}$, the cam $F^{11}$ adapted to be depressed by the first named cams, the interlocked estopment bars $F^{16}$ adapted to prevent the depression at a predetermined multiplier digit.

79. In a multiplying machine, a multiplier drum, means for rotating said drum, a plurality of multiplier members, means for setting said members to represent a multiplier number, and a plurality of estopment bars, adapted to prevent more than a predetermined amount of rotation of said drum, said bars being interlocked and being controlled by said setting means so that upon setting up said number all of those bars corresponding to lower denominations than the highest denomination in said number are rendered inoperative, whereupon the machine operates through the multiplier digit of highest denomination.

80. In a multiplying machine, a plurality of multiplier members, a plurality of estopment bars controlled by said members, means for setting said members to represent a multiplier number and to simultaneously displace said bars, and means for restoring said bars to their normal positions.

81. In a multiplying machine, a plurality of multiplicand members, a plurality of product members, an indentation member carrying said multiplicand members and adapted to perform indentation of the partial products in the process of multiplication, and means for returning said indentation member to its normal position.

82. In a multiplying machine, a plurality of multiplicand members, a plurality of product members, an indentation member carrying said multiplicand members and adapted to perform indentation of the partial product in the process of multiplication, and means for simultaneously returning said indentation member and said multiplicand members to their respective normal positions.

83. In a multiplying machine, a rotatable shaft forming one element, a depressible indentation member, connecting devices intermediate of said shaft and said member adapted to engage only in the depressed position of said member, devices operative on said indentation member forming a second element, a ratchet wheel secured to one of said elements, and a pawl secured to the other of said elements, whereby the rotation of said shaft in only one direction turns said indentation member.

84. In combination with a multiplying machine having a plurality of multiplier members, a spring motor, means adapted to rewind said motor, and means adapted, during the rewinding operation, to return said members to their normal positions.

85. In a multiplying machine, a plurality of multiplicand members forming one element, a plurality of product members forming another element, a plurality of multiplier members, and devices adapted, upon the return movement of one of said elements, to restore said multiplier members to their normal position.

86. In a multiplying machine, an indentation member, a plurality of multiplier members, and devices intermediate of said indentation member and said multiplier members, whereby, during a predetermined part of the return movement of the indentation member, the multiplier members are restored to their normal position.

87. In a multiplying machine, a plurality of multiplier members, the catch $L^5$, the cam plate $L^1$, and the rod $L^4$ adapted to be moved by said catch, whereby said multiplier members are restored to their zero positions, and the pin $L^6$ adapted to release said rod from said catch when said members have been restored.

88. In a multiplying machine, a plurality of multiplicand members forming one element, a plurality of product members forming another element, and devices adapted, upon the return movement of one of said elements, to restore said multiplicand members to their normal positions.

89. In combination with a calculating machine comprising a plurality of actuating members and a device adapted, upon movement, to restore said members to their normal position, of a spring motor, means for rewinding said motor, and means intermediate of said device and said motor whereby said movement is produced during the rewinding operation.

90. In combination with a calculating machine comprising a plurality of actuating members and a device adapted, upon movement, to restore said members to their normal position, of a spring motor, means for rewinding said motor, and means intermediate of said device and said motor whereby said movement is produced at will during the rewinding operation.

91. In a multiplying machine, a plurality of multiplicand members, an indentation member, a device intermediate of said multiplicand members and said indentation member, whereby, at a predetermined part of the return movement of said indentation member, said multiplicand members are restored to their normal position.

92. In a multiplying machine, an indentation member, a plurality of multiplicand members, a cam plate adapted, upon movement, to restore said members to their normal position, a depressible rod connected to said plate, a catch carried by the indentation member adapted to engage said rod only in its depressed position and only during the return movement of the indentation member and means for producing said movement, whereby said multiplicand members may be restored at will.

93. In a multiplying machine, a plurality of multiplicand members, means for setting said members to represent a multiplicand number, an indentation member, the cam plate $M^6$, the catch $M^5$, the rod $M^3$, and means for returning said indentation member to its normal position, whereupon, at a predetermined part of the return movement, said catch engages said rod and restores said multiplicand members to their zero positions only when said rod is in its depressed position.

94. In a multiplying machine, a plurality of multiplicand members, means for setting said members to represent a multiplicand number, an indentation member, the cam plate $M^6$, the catch $M^5$, the rod M, means for returning said indentation member to its normal position, whereupon, at a predetermined part of the return movement, said catch engages said rod and restores said multiplicand members to their zero position, and the pin $M^9$ adapted to release said catch when said multiplicand members have been restored.

95. In combination with a calculating machine having a plurality of result indicators, of a spring motor, means for rewinding said motor, and means adapted, during the rewinding operation, to restore said indicators to their zero position.

96. In a multiplying machine, means for setting up a multiplicand number, means for setting up a multiplier number, means for performing the multiplication of said numbers, a plurality of product type wheels adapted to be turned in accordance with said multiplication, and means for restoring said wheels to their zero position.

97. In a multiplying machine, means for setting up a multiplicand number, means for setting up a multiplier number, means for performing the multiplication of said numbers including a spring motor, a plurality of product type wheels adapted to be turned in accordance with said multiplication, and means for restoring said wheels to their zero position during the rewinding operation of said motor.

98. In a multiplying machine, a plurality of product members forming one element, a plurality of multiplicand members forming another element, and means for restoring said product members to their normal position, said means being adapted to operate only when one of said elements is being reset to its normal position.

99. In a multiplying machine, a plurality of product indicators, an indentation member, and devices intermediate of said indicators and said member whereby, at a predetermined part of the return movement of said member, said indicators are returned to their zero position.

In testimony whereof I affix my signature, in presence of two witnesses.

LEON W. ROSENTHAL.

Witnesses:
WILLIAM H. DAVIS,
MARENS P. HOPKINS.